United States Patent
Nishida et al.

(10) Patent No.: US 10,038,880 B2
(45) Date of Patent: Jul. 31, 2018

(54) CONTROL DEVICE, METHOD, AND MEDIUM CONTROLLING DISPLAY OF IMAGES

(71) Applicant: CANON KABUSHIKI KAISHA, Tokyo (JP)

(72) Inventors: Ryuji Nishida, Yokohama (JP); Takeshi Ikeda, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/702,415

(22) Filed: Sep. 12, 2017

(65) Prior Publication Data

US 2018/0077394 A1     Mar. 15, 2018

(30) Foreign Application Priority Data

Sep. 14, 2016   (JP) .................................. 2016-179335

(51) Int. Cl.
  *H04N 9/31*   (2006.01)
(52) U.S. Cl.
  CPC ......... *H04N 9/3147* (2013.01); *H04N 9/3155* (2013.01); *H04N 9/3164* (2013.01); *H04N 9/3188* (2013.01); *H04N 9/3194* (2013.01)
(58) Field of Classification Search
  CPC .. H04N 9/3147; H04N 9/3155; H04N 9/3164; H04N 9/3188; H04N 9/3194
  See application file for complete search history.

(56) References Cited

U.S. PATENT DOCUMENTS

2014/0268065 A1\*  9/2014  Ishikawa ................ G03B 41/00
                                                             353/30

FOREIGN PATENT DOCUMENTS

JP           2007-243712 A       9/2007

\* cited by examiner

*Primary Examiner* — Michael Teitelbaum
(74) *Attorney, Agent, or Firm* — Canon U.S.A., Inc. IP Division

(57) ABSTRACT

A control device is connectable to a first projection device and a second projection device. The first projection device performs projection onto a projection area to display a first image with a first resolution in the projection area. The second projection device performs projection onto the projection area to display a second image with a second resolution lower than the first resolution in the projection area. Both the first and second images are displayed to display an image based on target image data in the projection area. The control device includes a control unit that controls the display of the first image and the display of the second image based on the target image data. The control unit controls the display of the first image and the second image such that the first image attains gradation almost equal to gradation of the target image data.

7 Claims, 11 Drawing Sheets

CONTROL DEVICE, METHOD, AND MEDIUM CONTROLLING DISPLAY OF IMAGES

BACKGROUND

Field of the Disclosure

The present disclosure generally relates to control and, more particularly, to a control device, method, and medium controlling display of images by use of a projection device.

Description of the Related Art

Projection devices such as projectors have been used to display high-resolution images (images with high resolution), high-luminance images (images with high luminance), and others. For example, the display of images with a resolution of 3840 horizontal×2160 vertical pixels has come into widespread use. Another desired resolution is 7860 horizontal×4320 vertical pixels. The resolution of 3840 horizontal×2160 vertical pixels is called "4K resolution," and the resolution of 7860 horizontal×4320 vertical pixels is called "8K resolution."

However, it is difficult to display high-resolution images by one projection device, and the manufacture of projection devices capable of displaying high-resolution images involves high costs. To reduce manufacturing costs for projection devices capable of displaying high-resolution images, there is the need to wait for development of a new manufacturing technique, development of a new projection device (new projection method), proliferation of projection devices capable of displaying high-resolution images, and others. In addition, the higher resolutions of display images (displayed images) may result in reduction of aperture ratio of display elements (such as a liquid crystal element). Accordingly, it is difficult to achieve higher resolution and higher luminance of display images at the same time.

For example, Japanese Patent Laid-Open No. 2007-243712 proposes a projection method called "tile projection" as a technique for displaying high-resolution images using a plurality of projection devices. In tile projection, a plurality of partial images constituting an original image is used. The plurality of partial images is arranged in a tile form (matrix). In addition, a plurality of projection devices is used in correspondence with the plurality of partial images. Each of the projection devices displays a partial image corresponding thereto. In this way, the plurality of projection devices displays the plurality of partial images arranged in a tile form. This achieves display of an image with the same resolution as that of the original image.

For example, as a plurality of partial images constituting an original image with 4K resolution, four partial images arranged in a matrix with two rows and two columns are used. The resolution of the partial images is 1920 horizontal×1080 vertical pixels. The resolution of 1920 horizontal×1080 vertical pixels is called "full high definition (FHD) resolution." In addition, four projection devices capable of displaying images with FHD resolution are used. The four projection devices display the four partial images arranged in a matrix with two rows and two columns. This achieves display of an image with 4K resolution (the resolution of the original image).

There has been proposed a projection method called "stack projection" as a technique for achieving display of high-resolution images using a plurality of projection devices that has been already diffused (or is being diffused). The projection devices perform projection onto a projection area in a projection surface to display images in the projection area. In stack projection, the plurality of projection devices has a projection area in common. That is, the plurality of projection devices performs a plurality of projections onto one projection area. This enhances the luminance of the display image. For example, in stack projection with two projection devices, the luminance of the display image is twice as high as the luminance of a display image with one projection device.

As a light source (light emission element) for projection devices, a lamp has been conventionally used in many cases. In recent years, however, a solid-state light source (LED) has been increasingly used as a light source for projection devices. It is easy to modulate the light emission luminance of the solid-state light source, and the use of the solid-state light source can increase the degree of freedom for luminance control (control of luminance of a display image, control of luminance of the solid-state light source, and the like). Modifying partially the luminances of a plurality of solid-state light sources arranged in an array makes it possible to change partially the display luminances. For display devices (devices displaying images on their screens), a technique called "local dimming control" has been in practical use as a technique using the features of the solid-state light source. In local dimming control, the light emission luminances of the solid-state light sources are individually controlled (individual control of light emission luminances). This improves the contrast of the display image. With application of local dimming control to the projection devices, the improvement in the contrast of the display image can be expected.

In addition, using the techniques such as tile projection, stack projection, and individual control of light emission luminances, it is possible to achieve display of images with high resolution, high luminance, and high contrast.

For example, performing stack projection using a plurality of projection devices capable of displaying high-resolution images makes it possible to achieve display of images with high resolution and high luminance. However, projection devices capable of displaying high-resolution images are highly expensive, and using a plurality of such projection devices leads to extremely high costs.

Performing both tile projection and stack projection using a plurality of projection devices capable of displaying high-resolution images makes it possible to achieve display of images with high resolution and high luminance. However, according to this configuration, a large number of projection devices are necessary. In the case of performing tile projection by displaying four partial images with FHD resolution to achieve an image with 4K resolution and performing stack projection to enhance display luminances of the partial images (luminance of the display image, that is, luminance on the projection surface), at least eight (=4×2) projection devices are needed.

In addition, in tile projection, stack projection, and others, the projection devices need to be adjusted in projection area (the positions, sizes, and shapes of the projection areas). With a larger number of projection devices, the adjustment of the projection areas becomes more complicated to increase a burden on the user. Accordingly, in the foregoing configuration with both tile projection and stack projection, the user needs to bear a significantly heavy burden of adjusting the projection areas.

As described above, the conventional techniques do not allow preferable display of images in a simple configuration. For example, according to the conventional techniques, it is not possible to display images with high resolution, high luminance, and high contrast at low costs and with fewer burdens on the user.

SUMMARY

One or more aspects of the present disclosure may address one or more of the foregoing issues.

In one or more aspects, the present disclosure provides a technique for displaying images favorably using a plurality of projection devices in a simple configuration.

An aspect of the present disclosure is a control device connectable to a first projection device and a second projection device, wherein the first projection device performs projection onto a projection area in a projection surface to display a first image with a first resolution in the projection area, the second projection device performs projection onto the projection area to display a second image with a second resolution lower than the first resolution in the projection area, and both the first image and the second image are displayed to display an image based on target image data in the projection area, the control device includes a control unit that controls the display of the first image by the first projection device and the display of the second image by the second projection device based on the target image data, and the control unit controls the display of the first image and the display of the second image such that the first image attains gradation almost equal to gradation of the target image data.

Further features of the present disclosure will become apparent from the following description of exemplary embodiments (with reference to the attached drawings).

The accompanying drawings, which are incorporated in and constitute a part of the specification, illustrate exemplary embodiments, features, and aspects of the disclosure and, together with the description, serve to explain the principles of the invention.

DESCRIPTION OF THE EMBODIMENTS

Various exemplary embodiments, features, and aspects of the disclosure will be described in detail below with reference to the drawings.

First Embodiment

A first embodiment of the present disclosure will be described below. In the following description, liquid crystal projectors are used as projection devices as an example. However, the projection devices are not limited to liquid crystal projectors. For example, instead of liquid crystal elements, micro electro mechanical system (MEMS) shutter projection devices using MEMS shutters may be used.

Figure 1:
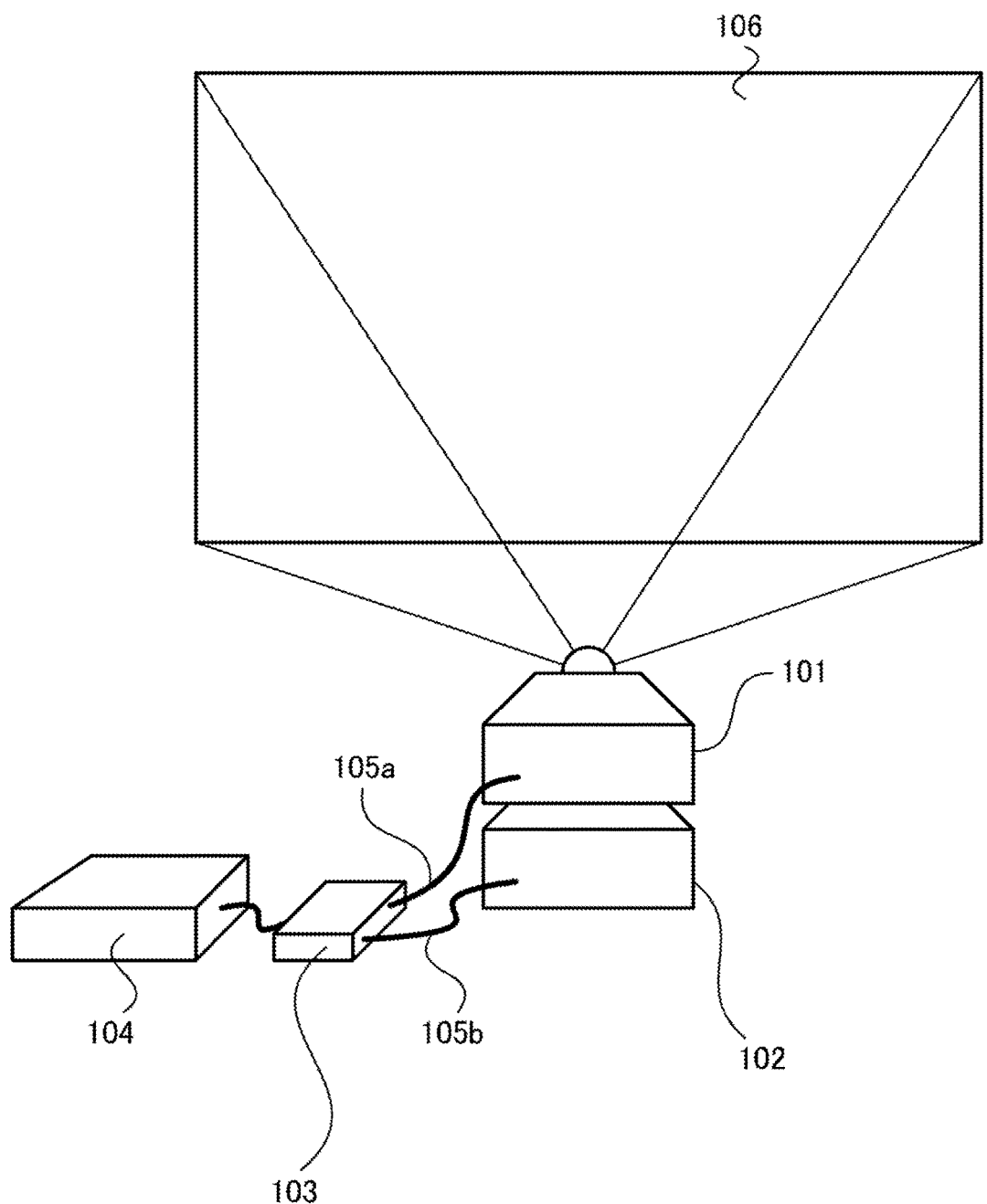
FIG. 1 is a diagram of a broad configuration example of a display system according to one or more aspects.

FIG. 1 is a diagram of a broad configuration example of a display system according to a first embodiment. The display system according to the embodiment has a first projection device 101, a second projection device 102, an image distribution device (control device) 103, and an image output device 104. The image distribution device 103 is connectable to various devices. Referring to FIG. 1, the image distribution device 103 is connected to the first projection device 101, the second projection device 102, and the image output device 104. The image distribution device 103 is connected to the first projection device 101 using a cable 105a and is connected to the second projection device 102 using a cable 105b. There is no particular limitation on the method for connecting the devices. For example, a plurality of devices may be connected together in a wireless manner.

The first projection device 101 performs projection onto a projection area in a screen 106 (projection surface) to display a first image with 4K resolution in the projection area. The second projection device 102 performs projection onto the projection area in the screen 106 to display a second image with FHD resolution in the projection area. The 4K resolution is, for example, a resolution of 3840 horizontal×2160 vertical pixels. The FHD resolution is, for example, a resolution of 1920 horizontal×1080 vertical pixels. There are no limitations on the resolution of the first image (the first resolution) and the resolution of the second image (the second resolution) as far as the first resolution is higher than the second resolution.

In the first embodiment, the first projection device 101 and the second projection device 102 are arranged in such a manner as to perform stack projection. Specifically, the first projection device 101 and the second projection device 102 have the projection area in common. In the first embodiment, both the first image and the second image are displayed to display a target image (image based on target image data) in the projection area. The target image data is image data of a display target. In stack projection, the first image and the second image are displayed in an overlapping manner to display the target image with high luminance.

In the first embodiment, the upper limit of the resolution of images displayable by the second projection device 102 is lower than the upper limit of the resolution of images displayable by the first projection device 101. Accordingly, the cost of the second projection device 102 is lower than the cost of the first projection device 101. In addition, in the first projection device 101, the aperture ratio of the display element (liquid crystal element) is limited to achieve higher resolution of display image. Accordingly, the upper limit of the luminance of images displayable by the first projection device 101 is lower than the upper limit of the luminance of images displayable by the second projection device 102. Since the upper limit of the resolution of images displayable by the first projection device 101 is high, the target image can be displayed with high resolution.

The first projection device 101 has a first light emission unit and a first projection unit that modulates light emitted from the first light emission unit and projects the modulated light onto the projection area. In the first embodiment, the first light emission unit has a plurality of first light source units that corresponds to a plurality of first areas constituting the projection area. The first light source units have one or more light sources (light emission elements). The light sources may be, for example, solid-state light sources such as light emitting diodes (LEDs), organic EL elements, semiconductor lasers, and plasma elements. In the first embodiment, as the plurality of first areas, five horizontal areas and three vertical areas, total 15 areas are used. There are no particular limitations on the number of the first areas, the layout of the first areas, and others.

The second projection device 102 has a second light emission unit and a second projection unit that modulates light emitted from the second light emission unit and projects the modulated light onto the projection area. The second light emission unit has one or more second light source units that correspond to one or more second areas constituting the projection area. The second light source units have one or more light sources. The second area is formed from one or more first areas. In the first embodiment, the same areas as the first areas are used as the second areas. Accordingly, in the first embodiment, as the plurality of second areas, five horizontal areas and three vertical areas, total 15 areas are used. There are no particular limitations on the number of the second areas, the layout of the second areas, and others.

In the first embodiment, the luminances of the first light source units are individually controlled, and the luminances of the second light sources are individually controlled. Accordingly, the display images (the first image, the second image, the target image, and others) can be enhanced in contrast. For example, the light emission luminance in the area where an image area with low luminance (such as a black image area) is displayed is controlled to be lower than the light emission luminance in the area where an image area with a high luminance (such as a white image area) is displayed. This enhances the display images in contrast.

In the first embodiment, the image distribution device 103 and the image output device 104 can process image data with 4K resolution or lower ones. The 4K resolution is a resolution of 3840 horizontal×2160 vertical pixels, for example. There are no particular limitations on the resolution of image data processible by the image distribution device 103 and the resolution of image data processible by the image output device 104.

The image output device 104 acquires, holds, and outputs the image data. In the first embodiment, the image output device 104 outputs the target image data with 4K resolution to the image distribution device 103. The image output device 104 may be, for example, a personal computer, an optical disc player, or the like. The resolution of the target image data is not limited to the 4K resolution.

The image distribution device 103 controls display of the first image by the first projection device and display of the second image by the second projection device based on the target image data output from the image output device 104. In the first embodiment, the image distribution device 103 acquires the target image data output from the image output device 104, and generates first image data with 4K resolution, second image data with FHD resolution, and others based on the target image data. Then, the image distribution device 103 outputs the first image data and the like to the first projection device 101, and outputs the second image data and the like to the second projection device 102.

The first projection device 101 performs projection (emission of light) onto the projection area based on the first image data and the like output from the image distribution device 103. Accordingly, the first image is displayed in the projection area. The second projection device 102 performs projection onto the projection area based on the second image data and the like output from the image distribution device 103. Accordingly, the second image is displayed in the projection area.

Figure 14A:
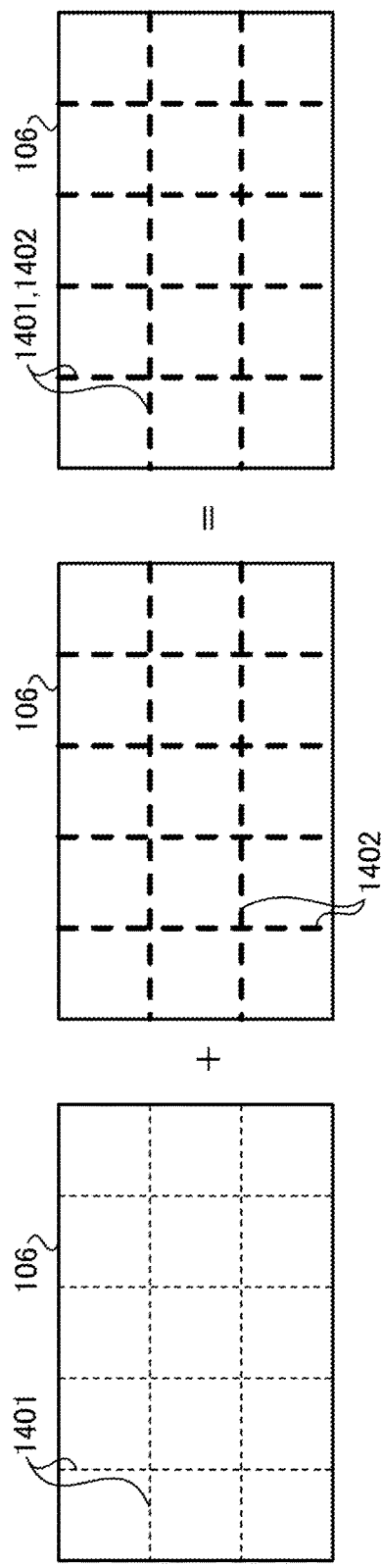
FIGS. 14A and 14B are diagrams of examples of first areas, second areas, a first image, and a second image according to one or more aspects.

FIG. 14A is a diagram of an example of the first areas and the second areas on the screen 106. FIG. 14A illustrates the first areas, the second areas, and an overlap of the first areas and the second areas in this order. Referring to FIG. 14A, narrow dashed lines 1401 indicate the boundaries between the plurality of first areas, and thick dashed lines 1402 indicate the boundaries between the plurality of second areas. As described above, in the first embodiment, the plurality of first areas is equal to the plurality of second areas. Accordingly, when the first areas and the second areas overlap, the narrow dashed lines 1401 coincide with the thick dashed lines 1402.

Figure 14B:
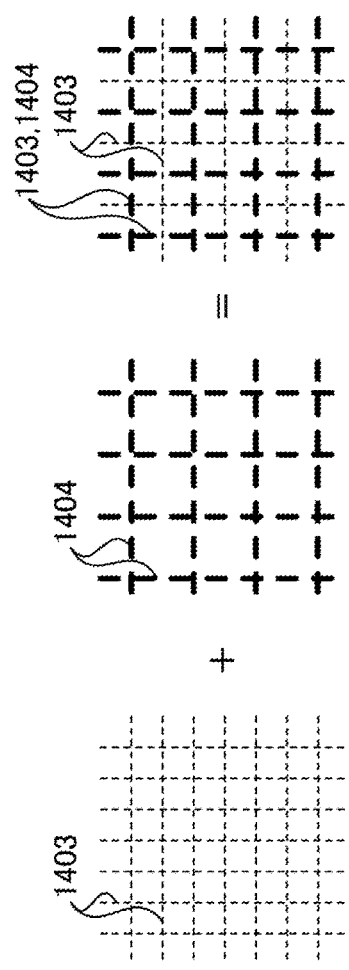

FIG. 14B is a diagram of an example of the first image and the second image on the screen 106. FIG. 14B illustrates the first image, the second image, and an overlap of the first image and the second image in this order. Referring to FIG. 14B, narrow dashed lines 1403 indicate the boundaries between a plurality of first pixels, and thick dashed lines 1404 indicate the boundaries between a plurality of second pixels. The first pixels are the pixels of the first image, and the second pixels are the pixels of the second image. It can be seen from the narrow dashed lines 1403 and the thick dashed lines 1404 that the resolution of the first image is higher than the resolution of the second image. It can also be seen from the overlap of the first image and the second image that the thick dashed lines 1404 coincide with the narrow dashed lines 1403. It can also be seen that two horizontal pixels×two vertical pixels, total four first pixels are included in each of the plurality of areas corresponding to the plurality of second pixels. It can still also be seen that the horizontal resolution of the first image (the resolution oriented in the horizontal direction) is twice as high as the horizontal resolution of the second image, and the vertical resolution of the first image (the resolution oriented in the vertical direction) is twice as high as the vertical resolution of the second image. There are no particular limitations on the resolution of the first image, the resolution of the second image, the number of the first pixels included in the areas of the second pixels, and the like.

Figure 2:
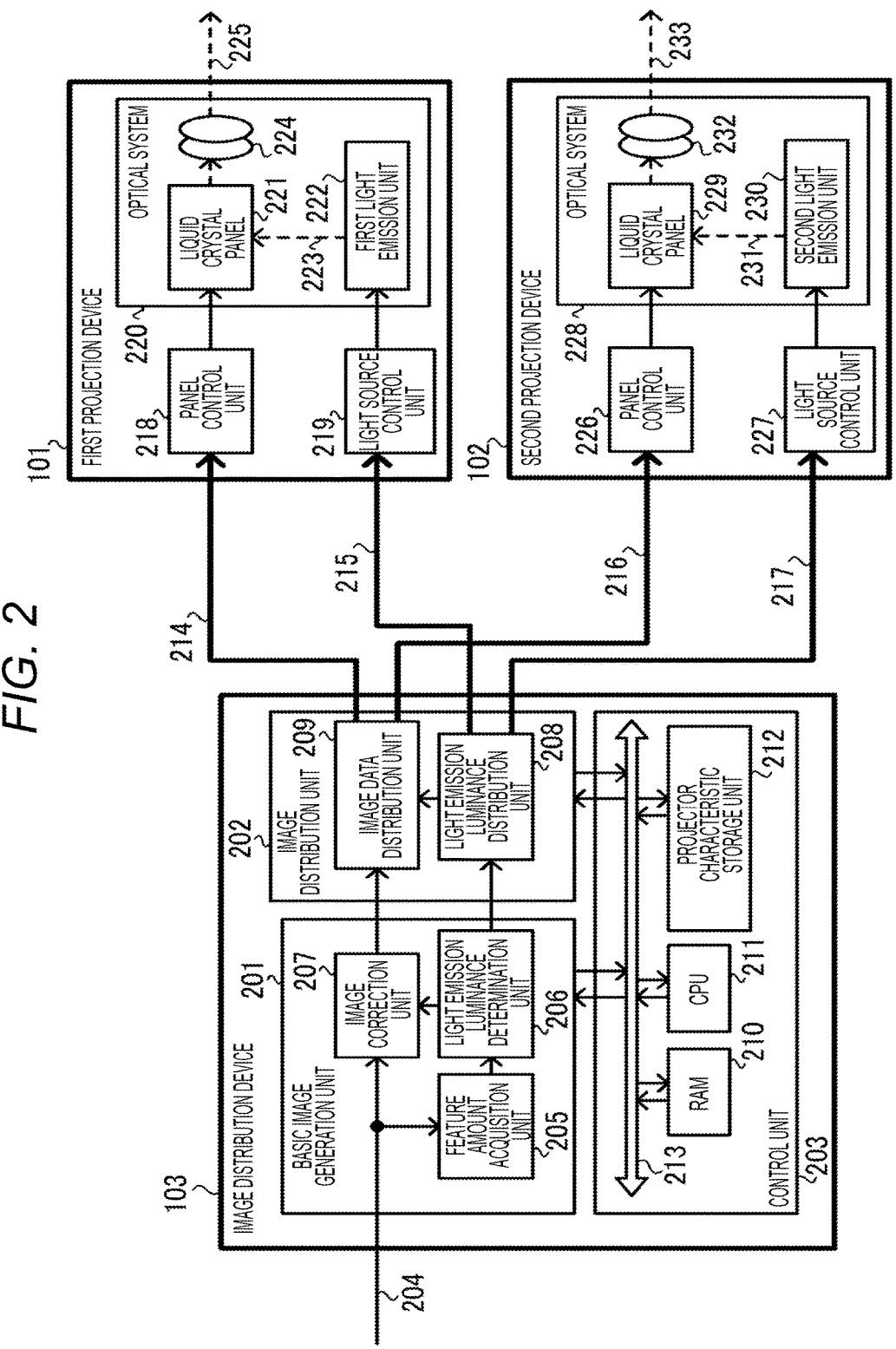
FIG. 2 is a diagram of a configuration example of the display system according to one or more aspects.

FIG. 2 is a diagram of a configuration example of the display system according to the first embodiment. FIG. 2 does not illustrate the image output device 104 and the screen 106. The image distribution device 103 is connected to the image output device 104 via an image data transmission bus 204. The image distribution device 103 is connected to the first projection device 101 via an image data transmission bus 214 and a light source control value transmission bus 215. The image data transmission bus 214 and the light source control value transmission bus 215 are included in the cable 105a illustrated in FIG. 1. The image distribution device 103 is connected to the second projection device 102 via an image data transmission bus 216 and a light source control value transmission bus 217. The image data transmission bus 216 and the light source control value transmission bus 217 are included in the cable 105b illustrated in FIG. 1. The first projection device 101 outputs light 225. When the screen 106 is irradiated with the light 225, the first image is displayed on the screen 106. The second projection device 102 outputs light 233. When the screen 106 is irradiated with the light 233, the second image is displayed on the screen 106.

The image distribution device 103 has a basic image generation unit 201, an image distribution unit 202, and a control unit 203. The target image data output from the image output device 104 is input into the image distribution device 103 via the image data transmission bus 204.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

The basic image generation unit 201 determines the light emission luminance and generates basic image data based on the target image data. The basic image generation unit 201 outputs the determined light emission luminance and the generated basic image data to the image distribution unit 202.

The image distribution unit 202 generates the first image data, a first light source control value, the second image data, and a second light source control value from the light emission luminance and the basic image data output from the basic image generation unit 201, based on the display characteristics of the first projection device 101 and the display characteristics of the second projection device 102. The first light source control value is a value related to the light emission luminance of the first light emission unit (the first light source units), and the second light source control value is a value related to the light emission luminance of the second light emission unit (the second light source units). The image distribution unit 202 outputs the first image data to the first projection device 101 via the image data transmission bus 214, and outputs the first light source control value to the first projection device 101 via the light source control value transmission bus 215. The image distribution unit 202 outputs the second image data to the second projection device 102 via the image data transmission bus 216, and outputs the second light source control value to the second projection device 102 via the light source control value transmission bus 217.

The control unit 203 controls the operations of the image distribution device 103 and stores various kinds of information (data). For example, the control unit 203 reads and executes programs (such as software programs) recorded in advance in a storage unit to control the operations of the image distribution device 103. In the first embodiment, the control unit 203 is connected to the basic image generation unit 201, the image distribution unit 202, and the like via control signal lines to implement the control of the operations of the image distribution device 103, the cooperation of the functional units in the image distribution device 103, and the like. The operations of the control unit 203 may be automatically performed or may be performed according to a user operation on the image distribution device 103.

The basic image generation unit 201 has a feature amount acquisition unit 205, a light emission luminance determination unit 206, and an image correction unit 207.

The feature amount acquisition unit 205 analyzes and counts the target image data to acquire the feature amount of the target image data. In the first embodiment, the feature amount acquisition unit 205 acquires the feature amount of the target image data for each of the first areas (each of the second areas). The feature amount includes, for example, representative values of a plurality of gradation values (pixel values, luminance values, and the like) in the first area, a histogram of the plurality of gradation values in the first area, and the like. The representative values are mean value, maximum value, minimum value, intermediate value, mode value, and the like. The feature amount acquisition unit 205 outputs the acquired feature amounts to the light emission luminance determination unit 206.

The light emission luminance determination unit 206 determines the light emission luminance based on the target image data. In the first embodiment, the light emission luminance determination unit 206 determines the light emission luminance based on the feature amounts output from the feature amount acquisition unit 205. Specifically, the light emission luminance determination unit 206 performs on each of the first areas an operation for determining the light emission luminance based on the feature amount acquired for each of the first areas. The light emission luminance determination unit 206 outputs the information on the determined luminance to the image correction unit 207 and the image distribution unit 202.

The image correction unit 207 corrects the target image data based on the luminances (in the first areas) determined by the light emission luminance determination unit 206 to generate the basic image data. In a liquid crystal projector, the luminance of a display image is determined by the light emission luminance of a light emission unit, the aperture ratio of a liquid crystal panel, and the like. Accordingly, with a change in the light emission luminance of the light emission unit, the display luminance (the luminance of the display image and the luminance on the projection plane) also changes. The image correction unit 207 corrects the target image data to suppress the change of the display luminance due to the change of the light emission luminance. Although there is no particular limitation on the correction method of the target image data, the image correction unit 207 of the first embodiment estimates the luminance of the light emitted from the light emission unit at the time of arrival at the liquid crystal panel (arrival luminance) based on the light emission luminances determined for the first areas. The arrival luminance is estimated for each of a plurality of positions in the liquid crystal panel. Then, the image correction unit 207 determines correction values for correcting the target image data (coefficients by which the gradation values are to be multiplied, offset values to be added to the gradation values, and the like) based on the estimated arrival luminances such that the luminance indicated by the target image data can be obtained as display luminance. The correction values are determined for each of the gradation values of the target image data. After that, the image correction unit 207 corrects the target image data using the determined correction values to generate the basic image data. The image correction unit 207 outputs the generated basic image data to the image distribution unit 202.

The image distribution unit 202 has a light emission luminance distribution unit 208 and an image data distribution unit 209.

The light emission luminance distribution unit 208 generates the first light source control values and the second light source control values based on the light emission luminances determined by the light emission luminance determination unit 206. In the first embodiment, the light emission luminance distribution unit 208 performs on each of the plurality of first areas an operation for determining the light emission luminance of the first light source unit corresponding to the first area and the light emission luminance of the second light source unit corresponding to the second area equal to the first area, from the light emission luminance determined for the first area. Then, the light emission luminance distribution unit 208 generates the respective first light source control values of the first light source units according to the light emission luminances of the first light source units, and generates the respective second light source control values of the second light source units according to the light emission luminances of the second light source units. The light emission luminance distribution unit 208 outputs the first light source control values of the first light source units to the first projection device 101 via the light source control value transmission bus 215. The light emission luminance distribution unit 208 outputs the second light source control values of the second light source units to the second projection device 102 via the light source control value transmission bus 217. The light emission luminance distribution unit 208 also outputs the information on the light emission luminances of the first light emission unit (the first light source units) and the information on the light emission luminances of the second light emission unit (the second light source units) to the image data distribution unit 209.

The image data distribution unit 209 generates the first image data and the second image data based on the target image data. In the first embodiment, the image data distribution unit 209 generates the first image data and the second image data based on the basic image data, the light emission luminances of the first light source units, and the light emission luminances of the second light source units. The image data distribution unit 209 outputs the first image data to the first projection device 101 via the image data transmission bus 214 and outputs the second image data to the second projection device 102 via the image data transmission bus 216.

The control unit 203 has a RAM 210, a CPU 211, a projector characteristic storage unit 212, and a bus 213.

The RAM 210 records in advance various kinds of data such as programs and control data. The CPU 211 is connected to the functional units of the control unit 203, the basic image generation unit 201, the image distribution unit 202, and the like via the bus 213. The CPU 211 reads various kinds of data from the RAM 210, the projector characteristic storage unit 212, and the like via the bus 213 and outputs control commands according to the read data to the functional units via the bus 213. Accordingly, the operations of the functional units are controlled. The projector characteristic storage unit 212 records in advance the information indicating the characteristics of the first projection device 101, the information indicating the characteristics of the second projection device 102, and the like. Specifically, as the information indicating the characteristics of the first projection device 101, the projector characteristic storage unit 212 records in advance the upper limit of the resolution of images displayable by the first projection device 101, the upper limit of the light emission luminances of the first light emission unit, the first areas, and the like. As the information indicating the characteristics of the second projection device 102, the projector characteristic storage unit 212 records in advance the upper limit of the resolution of images displayable by the second projection device 102, the upper limit of the light emission luminances of the second light emission unit, the second areas, and the like.

The control unit 203 also performs operations for starting image input and output, operations according to user operations, and processes for various kinds of cooperation between the projection devices. For example, the control unit 203 has a communication unit (not illustrated) that communicates with the projection devices connected to the image distribution device 103. The control unit 203 uses the communication unit to acquire characteristic information indicating the characteristics of the projection devices from the projection devices. Specifically, the control unit 203 uses the communication unit to make a request for transmission of the characteristic information to the projection devices. Then, the control unit 203 acquires the characteristic information input from the projection devices in response to the request. After that, the control unit 203 records the acquired characteristic information in the projector characteristic storage unit 212. The characteristic information may be predetermined information or information generated according to a user operation or the like. For example, the control unit 203 may generate the characteristic information according to a user operation on the image distribution device 103 and record the generated characteristic information in the projector characteristic storage unit 212.

The first projection device 101 has a panel control unit 218, a light source control unit 219, and an optical system 220. The optical system 220 has a liquid crystal panel 221, a first light emission unit 222, and a projection lens 224. The first projection unit described above includes the liquid crystal panel 221 and the projection lens 224.

The panel control unit 218 drives the liquid crystal panel 221 based on the first image data input via the image data transmission bus 214. The liquid crystal panel 221 has a plurality of liquid crystal elements. For example, the liquid crystal panel 221 has a plurality of liquid crystal elements corresponding to a plurality of colors for each of a plurality of pixels of an image. The plurality of liquid crystal elements corresponding to the plurality of colors includes a liquid crystal element outputting a red component of incident light to the projection lens 224, a liquid crystal element outputting a green component of incident light to the projection lens 224, and a liquid crystal element outputting a blue component of incident light to the projection lens 224. In the first embodiment, the liquid crystal panel 221 has a number of liquid crystal elements capable of displaying images with 4K resolution. When the liquid crystal panel 221 is driven based on the first image data, the aperture ratios of the liquid crystal elements of the liquid crystal panel 221 (transmission ratios or reflection ratios) are controlled to values based on the first image data.

There is no particular limitation on the driving method of the liquid crystal panel 221. In the first embodiment, the panel control unit 218 performs predetermined image processing on the first image data and generates a drive signal to drive the liquid crystal panel 221 based on the first image data after the predetermined image processing. For example, the predetermined image processing includes various kinds of image quality enhancement processing to improve the image quality of the display image (the first image), correction processing to suppress the deformation of the display image (the first image) depending on the optical system such as the projection lens 224, and the like. The panel control unit 218 supplies the generated drive signal to the liquid crystal panel 221. Accordingly, the liquid crystal panel 221 is driven.

The light source control unit 219 drives the first light emission unit 222 according to the first light source control values input via the light source control value transmission bus 215. When the first light emission unit 222 is driven according to the first light source control values, the light emission luminance of the first light emission unit 222 is controlled to the light emission luminance according to the first light source control values. In the first embodiment, the first light emission unit 222 has a plurality of first light source units corresponding to the plurality of first areas. The light source control unit 219 performs on each of the plurality of first light source units an operation for driving the first light source unit according to the first light source control value determined for the first light source unit. When the first light source units are driven according to the first light source control values, the light emission luminances of the first light source units are controlled to the light emission luminances according to the first light source control values.

There is no particular limitation on the driving method of the first light emission unit 222. In the first embodiment, the light source control unit 219 generates a driving signal to drive the first light source unit according to the first light source control value determined for the first light source unit. This operation is performed on each of the plurality of first light source units. The driving signal includes, for example, a PWM signal for controlling the duty ratio of the on time and off time of the first light source unit, a signal for controlling the amount of electric current supplied to the first light source unit, and the like. The light source control unit 219 supplies the driving signals to the first light source units. Accordingly, the first light source units are driven.

The light 223 emitted from the first light emission unit 222 is applied to the liquid crystal panel 221, modulated by the liquid crystal panel 221, and guided to the projection lens 224.

The projection lens 224 makes an optical change to the incident light (emitted from the first light emission unit 222 and modulated by the liquid crystal panel 221) and outputs the light 225 given the optical change. When the light 225 is applied to the screen 106, the first image is displayed on the screen 106. The state of the projection lens 224 (position, inclination, and the like) is controlled by a control unit (not illustrated) in the first projection device 101. The focus state, enlargement ratio, and the like of the first image can be changed by changing the state of the projection lens 224.

The second projection device 102 is configured in the same manner as the first projection device 101. The second projection device 102 has a panel control unit 226, a light source control unit 227, and an optical system 228. The optical system 228 has a liquid crystal panel 229, a second light emission unit 230, and a projection lens 232. The second projection unit described above includes the liquid crystal panel 229 and the projection lens 232.

The panel control unit 226 has the same function as that of the panel control unit 218. The panel control unit 226 drives the liquid crystal panel 229 based on the second image data input via the image data transmission bus 216. The liquid crystal panel 229 has the same function as that of the liquid crystal panel 221. In the first embodiment, the liquid crystal panel 229 has a number of liquid crystal elements capable of displaying images with FHD resolution.

The light source control unit 227 has the same function as that of the light source control unit 219. The light source control unit 227 drives the second light emission unit 230 according to the second light source control values input via the light source control value transmission bus 217. The second light emission unit 230 has the same function as that of the first light emission unit 222. In the first embodiment, the second light emission unit 230 has a plurality of second light source units corresponding to the plurality of second areas. As described above, the plurality of the second areas is equal to the plurality of first areas. The light source control unit 227 performs on each of the plurality of second light source units an operation for driving the second light source unit according to the second light source control value determined for the second light source unit.

The light 231 emitted from the second light emission unit 230 is applied to the liquid crystal panel 229, modulated by the liquid crystal panel 229, and guided to the projection lens 232.

The projection lens 232 has the same function as that of the projection lens 224. The projection lens 232 makes an optical change to incident light (emitted from the second light emission unit 230 and modulated by the liquid crystal panel 229) and outputs the light 233 given the optical change. When the light 233 is applied to the screen 106, the second image is displayed on the screen 106. The state of the projection lens 232 is controlled by a control unit (not illustrated) in the second projection device 102.

Figure 3A:
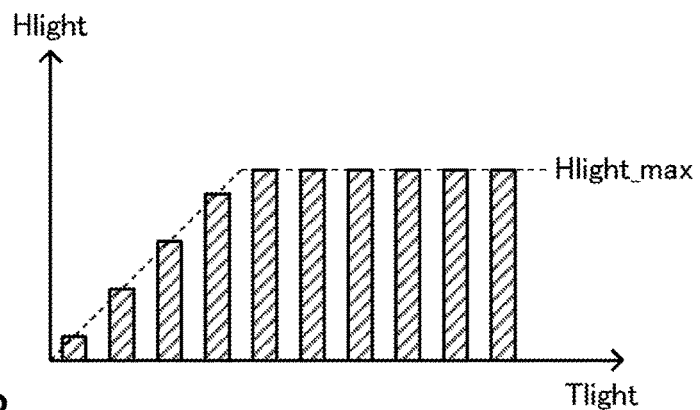
FIGS. 3A to 3C are diagrams of examples of light emission luminance according to one or more aspects.
Figure 3B:
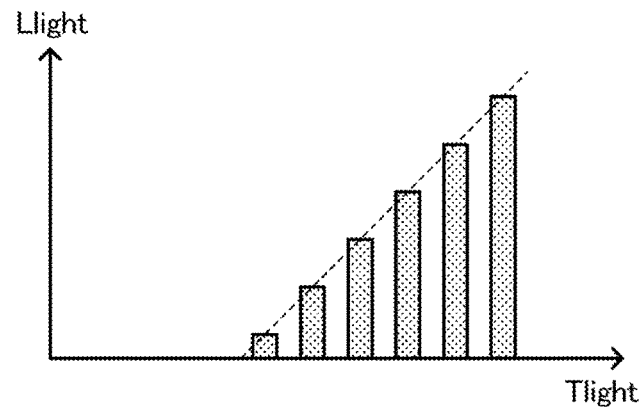
Figure 3C:
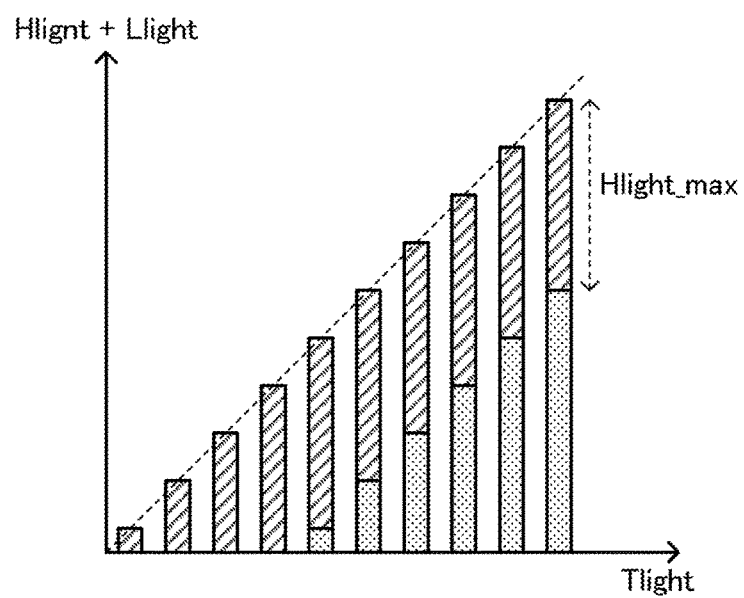

An example of operation of the light emission luminance distribution unit 208 will be described. In the first embodiment, the light emission luminance distribution unit 208 performs the operation described below in each of the first areas. FIG. 3A illustrates an example of correspondences between a light emission luminance Tlight determined by the light emission luminance determination unit 206 and a light emission luminance Hlight of the first light source unit. Referring to FIG. 3A, a light emission luminance Hlight_max is the upper limit of the light emission luminance Hlight. FIG. 3B illustrates an example of correspondences between the light emission luminance Tlight and a light emission luminance Llight of the second light source unit. FIG. 3C illustrates an example of correspondences between the light emission luminance Tlight and the sum of the light emission luminance Hlight and the light emission luminance Llight.

In the liquid crystal projector, the display luminance is determined by the light emission luminance of the light emission unit and the aperture ratio of the liquid crystal panel. Referring to FIGS. 3A to 3C, the light emission luminance is also the display luminance corresponding to the upper limit of the aperture ratio of the liquid crystal panel 221. For example, the light emission luminance Hlight is also the display luminance corresponding to the upper limit of the aperture ratio of the liquid crystal panel 221 (the display luminance of the first image), and the light emission luminance Llight is also the display luminance corresponding to the upper limit of the aperture ratio of the liquid crystal panel 229 (the display luminance of the second images).

In the first embodiment, as illustrated in FIG. 3C, the light emission luminance distribution unit 208 determines the light emission luminance Hlight and the light emission luminance Llight such that the sum of the light emission luminance Hlight and the light emission luminance Llight becomes almost equal to the light emission luminance Tlight. The "almost equality" includes "complete equality." There exists a plurality of combinations of the light emission luminance Hlight and the light emission luminance Llight satisfying "Tlight=Hlight+Llight." In the first embodiment, from the viewpoint of the resolution of displayable images, the first projection device 101 is higher in performance than the second projection device 102. Accordingly, it is preferable to determine the light emission luminance Hlight and the light emission luminance Llight such that the light emission luminance is assigned to the first light source units on a higher priority than the second light source units. Specifically, as high light emission luminance as possible is preferably determined as the light emission luminance Hlight. In addition, the second light sources are preferably not used as much as possible.

Accordingly, in the first embodiment, the light emission luminance distribution unit 208 determines the light emission luminance Hlight and the light emission luminance Llight such that the light emission luminance is assigned to the first light source units on a higher priority than the second light source units.

Specifically, when the light emission luminance Tlight is equal to or less than the upper limit, the light emission luminance distribution unit 208 determines the light emission luminance Hlight to be almost equal to the light emission luminance Tlight. The "almost equality" includes "complete equality." In the first embodiment, as illustrated in FIGS. 3A and 3B, when the light emission luminance Tlight≤the upper limit Hlight_max, the light emission luminance distribution unit 208 determines the light emission luminance Hlight=Tlight and the light emission luminance Llight=0.

Meanwhile, when the light emission luminance Tlight is higher than the upper limit, the light emission luminance distribution unit 208 determines the light emission luminance Hlight to be almost equal to the upper limit Hlight_max. The light emission luminance distribution unit 208 also determines the light emission luminance corresponding to the difference between the light emission luminance Hlight and the light emission luminance Tlight as the light emission luminance Llight. In the first embodiment, as illustrated in FIGS. 3A and 3B, when the light emission luminance Tlight>the upper limit Hlight_max, the light emission luminance distribution unit 208 determines the light emission luminance Hlight=Hlight_max and the light emission luminance Llight=Tlight−Hlight.

The determination method of the light emission luminance Hlight and the light emission luminance Llight is not limited to the foregoing one. For example, when the light emission luminance Tlight≤the upper limit Hlight_max, the light emission luminance Llight>0 may be determined. Alternatively, the light emission luminance Llight≠Tlight−Hlight may be determined.

An example of operation of the image data distribution unit 209 will be described. In the first embodiment, the image data distribution unit 209 performs the process described below on each of the plurality of areas corresponding to the plurality of second pixels. The target areas of the following process are not limited to the areas corresponding to one second pixel. For example, the following process may be performed on the areas corresponding to two or more second pixels.

Figure 4:
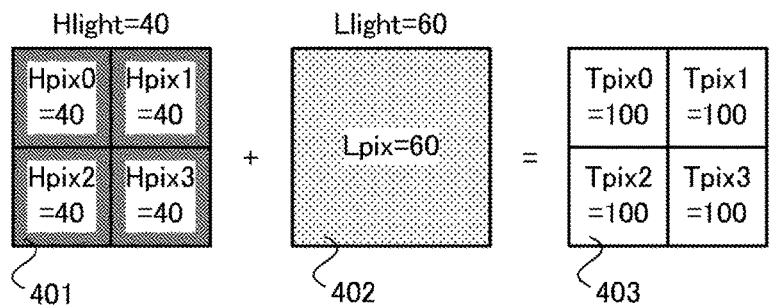
FIG. 4 is a diagram of an example of luminances (display luminance and data luminance) according to one or more aspects.

FIG. 4 illustrates examples of the luminances of the first pixels (display luminances), the luminance of the second pixel (display luminance), and the luminances of the target image data (luminances indicated by the target image data, that is, data luminance). FIG. 4 is a diagram relating to the area corresponding to one second pixel. Accordingly, FIG. 4 illustrates one second pixel 402 and four first pixels 401 included in the second pixel 402. In the first embodiment, the resolution of the first image is equal to the resolution of the target image data. Accordingly, FIG. 4 illustrates four pixels (403) (=four first pixels 401) as the pixels of the target image data.

Hereinafter, the display luminance of the upper left first pixel 401 will be described as "Hpix0," the display luminance of the upper right first pixel 401 will be described as "Hpix1," the display luminance of the lower left first pixel 401 will be described as "Hpix2," and the display luminance of the lower right first pixel 401 will be described as "Hpix3." The display luminance of the second pixel 402 will be described as "Lpix." In addition, the data luminance of the upper left pixel 403 will be described as "Tpix0," the data luminance of the upper right pixel 403 will be described as "Tpix1," the data luminance of the lower left pixel 403 will be described as "Tpix2," and the data luminance of the lower right pixel 403 will be described as "Tpix3." FIG. 4 provides specific values of the luminances (the display luminances or the data luminances) of the pixels. FIG. 4 provides normalized values as the values of the luminances such that the upper limit of the data luminance is 100.

FIG. 4 illustrates the example in which the aperture ratio of the liquid crystal panel 221 is set to the upper limit and the aperture ratio of the liquid crystal panel 229 is set to the upper limit. As described above, the light emission luminances Hlight and Llight are also the display luminances corresponding to the upper limit of the aperture ratio. FIG. 4 illustrates the example in which the light emission luminance Hlight=40 and the light emission luminance Llight=60. In the first embodiment, the upper limit of the luminance allowing display by the first projection device 101 is lower than the upper limit of the luminance allowing display by the second projection device 102. Accordingly, referring to FIG. 4, as the light emission luminance Hlight, the light emission luminance is set to 40 that is lower than the light emission luminance Llight=60. The ratio between the light emission luminance Hlight and the light emission luminance Llight varies depending on the target image data (the feature amounts acquired from the target image data).

In the first embodiment, the image data distribution unit 209 generates image data with gradation almost equal to the gradation of the target image data (specifically, the basic image data) as first image data. Specifically, the image data distribution unit 209 generates the first image data and the second image data in such a manner as to satisfy "TpixN=HpixN+Lpix (N=0, 1, 2, and 3)." Referring to FIG. 4, "TpixN=HpixN+Lpix" is satisfied in all the four first pixels 401 (the four pixels 403). There exists a plurality of combinations of display luminance HpixN and display luminance Lpix satisfying "TpixN=HpixN+Lpix." As with the light emission luminances Hlight and Llight, it is preferable to determine the display luminance HpixN and the display luminance LpixN such that the display luminance is assigned to the first image on a higher priority than the second image. Therefore, in the first embodiment, the image data distribution unit 209 determines the display luminance HpixN and the display luminance Lpix such that the display luminance is assigned to the first image on a higher priority than the second image.

In this case, the luminance range of the target image data will be described as "range_Tpix." The range range_Tpix is a value obtained by subtracting the minimum value among the data luminance Tpix0 to Tpix3 from the maximum value among the data luminance Tpix0 to Tpix3. The upper limit of the luminance range of the first image (the range of display luminance) depends on the light emission luminance Hlight. In the first embodiment, the upper limit of the luminance range of the first image ranges from the display luminance 0 to the display luminance equal to the light emission luminance Hlight. Accordingly, the value of the upper limit of the luminance range of the first image is equal to the value of the light emission luminance Hlight.

When the range range_Tpix is equal to or less than the range (light emission luminance) Hlight, "TpixN=HpixN+Lpix" can be satisfied in all the four first pixels 401 (the four pixels 403). Accordingly, in this case, the image data distribution unit 209 generates the first image data and the second image data such that "TpixN=HpixN+Lpix" can be satisfied. Specifically, the image data distribution unit 209 generates image data having gradation almost identical to the gradation of the target image data as the first image data. The image data distribution unit 209 also generates image data compensating for the difference between the data luminance TpixN and the display luminance HpixN by the display luminance Lpix as the second image data.

Meanwhile, when the range range_Tpix is larger than the range Hlight, "TpixN=HpixN+Lpix" cannot be satisfied in at least any of the four first pixels 401 (the four pixels 403). Accordingly, in this case, the image data distribution unit 209 reduces the gradation of the target image data to obtain image data with the luminance range almost identical to the range Hlight. The image data distribution unit 209 generates the first image data and the second image data based on the target image data after the reduction of the gradation.

Figure 5:
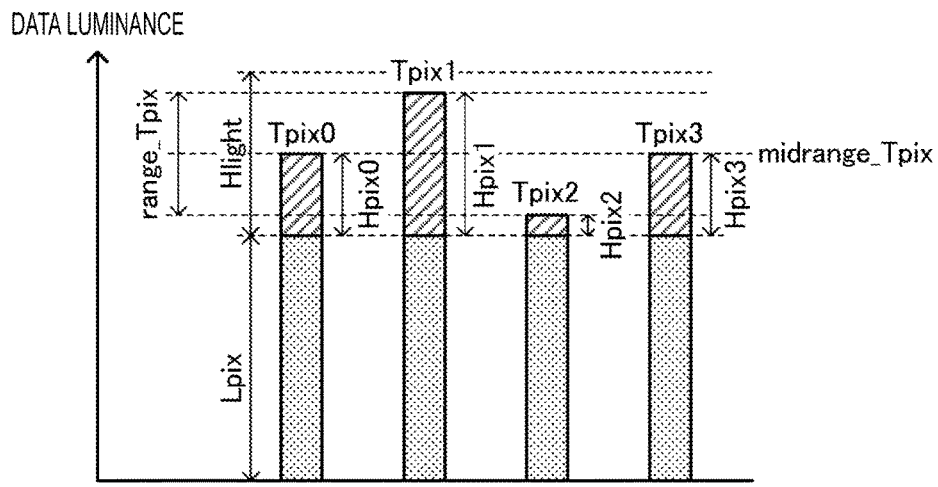
FIG. 5 is a diagram of an example of luminances (display luminance and data luminance) according to one or more aspects.

A specific example of operation of the image data distribution unit 209 will be described. First, the case of the range range_Tpix≤the range Hlight will be discussed. FIG. 5 illustrates an example of luminance distribution in the area of one second pixel. In the example of FIG. 5, the maximum value max_Tpix of the data luminances Tpix0 to Tpix3 is the data luminance Tpix1, and the minimum value min_Tpix of the data luminances Tpix0 to Tpix3 is the data luminance Tpix2. Accordingly, the range range_Tpix equals to the data luminance Tpix1−the data luminance Tpix2 (=the maximum value max_Tpix−the minimum value min_Tpix). In the example of FIG. 5, the range range_Tpix is smaller than the range Hlight.

In this case, the first image data and the second image data are generated such that variations in the luminance of the first image with respect to the middle of the upper limit of the luminance range of the first image are almost equal to variations in the luminance of the target image data with respect to the middle of the luminance range of the target image data. Specifically, the first image data and the second image data are generated such that variations in the display luminance HpixN with respect to the display luminance Hlight/2 are almost equal to variations in the data luminance TpixN with respect to the middle of the range of the data luminance TpixN.

First, the image data distribution unit 209 calculates the middle value midrange_Tpix of the range of the data luminances Tpix0 to Tpix3. The data luminance midrange_Tpix is calculated by Equation 1 described below. In the example of FIG. 5, (the data luminance Tpix1+the data luminance Tpix2)/2 is calculated as the data luminance midrange_Tpix.

$$\mathrm{midrange\_}\mathit{Tpix}=(\mathrm{max\_}\mathit{Tpix}+\mathrm{min\_}\mathit{Tpix})/2 \quad \text{(Equation 1)}$$

Next, the image data distribution unit 209 determines the display luminance Lpix such that the display luminance of the target image is almost equal to the data luminance midrange_Tpix when the display luminance of the first image is the display luminance Hlight/2. Specifically, the image data distribution unit 209 uses Equation 2 described below to calculate the display luminance Lpix. The image data distribution unit 209 determines the gradation value (pixel value) of the second image data based on the display luminance Lpix (and the light emission luminance Llight).

$$L\mathrm{pix}=\mathrm{midrange\_}\mathit{Tpix}-H\mathrm{light}/2 \quad \text{(Equation 2)}$$

Then, the image data distribution unit 209 calculates the display luminance HpixN by subtracting the display luminance Lpix from the data luminance TpixN as expressed by Equation 3 described below. The image data distribution unit 209 determines the gradation value (pixel value) of the first image data based on the display luminance HpixN (and the light emission luminance Hlight).

$$H\mathrm{pix}N=T\mathrm{pix}N-L\mathrm{pix} \quad \text{(Equation 3)}$$

According to the foregoing calculation, it is possible to equalize the variations in the display luminance HpixN with respect to the display luminance Hlight/2 to the variations in the data luminance TpixN with respect to the data luminance midrange_Tpix. In the case of attaining the display luminance Hlight/2 and its neighboring display luminances, the aperture ratio of the display element such as the liquid crystal element can be controlled in a favorable manner (with high accuracy). For example, the liquid crystal element has S-curve characteristics including characteristics 1 to 3 described below. Accordingly, in the case of driving the liquid crystal element at a voltage in a mid-voltage range, the aperture ratio of the liquid crystal element can be controlled in a favorable manner (with high accuracy). To achieve the display luminance Hlight/2 and its neighborhoods' display luminances, a voltage in the mid-voltage range is applied to the liquid crystal element. Accordingly, in the first embodiment, the variations in the display luminance HpixN with respect to the display luminance Hlight/2 are equalized to the variations in the data luminance TpixN with respect to the data luminance midrange_Tpix. This makes it possible to drive the liquid crystal element in the first projection device 101 at a voltage in the mid-voltage range as much as possible and control the aperture ratio of the liquid crystal element of the first projection device 101 with high accuracy.

Characteristic 1: When a voltage in a low-voltage range (a range of low voltages) is applied to the liquid crystal element, the aperture ratio changes gently with respect to voltage changes (increase or decrease).

Characteristic 2: When a voltage in a high-voltage range (a range of high voltages) is applied to the liquid crystal element, the aperture ratio changes gently with respect to voltage changes.

Characteristic 3: When a voltage in a mid-voltage range (a range between the low-voltage range and the high-voltage range) is applied to the liquid crystal element, the aperture ratio changes linearly with respect to voltage changes.

Figure 6:
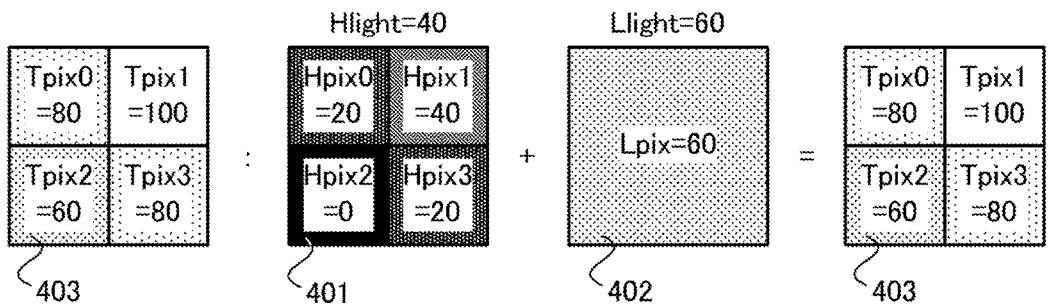
FIG. 6 is a diagram of an example of luminances (display luminance and data luminance) according to one or more aspects.

FIG. 6 illustrates an example of luminance distribution in the area of one second pixel. In the example of FIG. 6, the data luminance Tpix0 is 80, the data luminance Tpix1 is 100, the data luminance Tpix2 is 60, and the data luminance Tpix3 is 80. Accordingly, the data luminance max_Tpix is 100 (=Tpix1) and the data luminance min_Tpix is 60 (=Tpix2). The range range_Tpix is 40 (=max_Tpix−min_Tpix=100-60), the data luminance midrange_Tpix is 80 (=(max_Tpix+min_Tpix)/2=(100+60)/2). The light emission luminance Hlight is 40. In this case, the range range_Tpix=40 is equal to the range Hlight=40, and the display luminances Lpix and HpixN are calculated by Equations 2 and 3. Specifically, the display luminance Lpix=midrange_Tpix−Hlight/2=80-40/2=60 is calculated. Then, Hpix0=Tpix0−Lpix=80-60=20, Hpix1=Tpix1−Lpix=100-60=40, Hpix2=60-60=0, and Hpix3=80-60=20 are calculated.

Figure 7A:
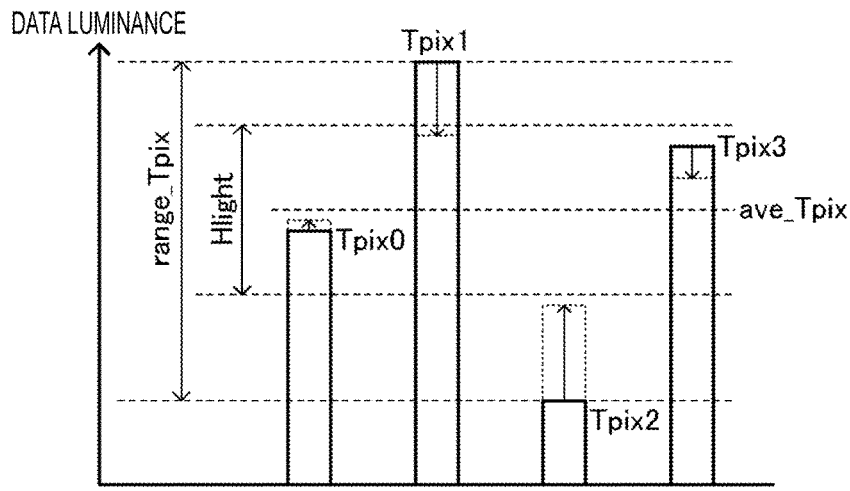
FIGS. 7A and 7B are diagrams of examples of luminances (display luminance and data luminance) according to one or more aspects.

The case where the range range_Tpix>the range Hlight will be described. FIG. 7A illustrates an example of luminance distribution in the area of one second pixel. In the example of FIG. 7A as well, the data luminance max_Tpix is the data luminance Tpix1, the data luminance min_Tpix is the data luminance Tpix2, the range range_Tpix is the data luminance Tpix1−the data luminance Tpix2. However, in the example of FIG. 7A, the range range_Tpix is wider than the range Hlight.

Figure 7B:
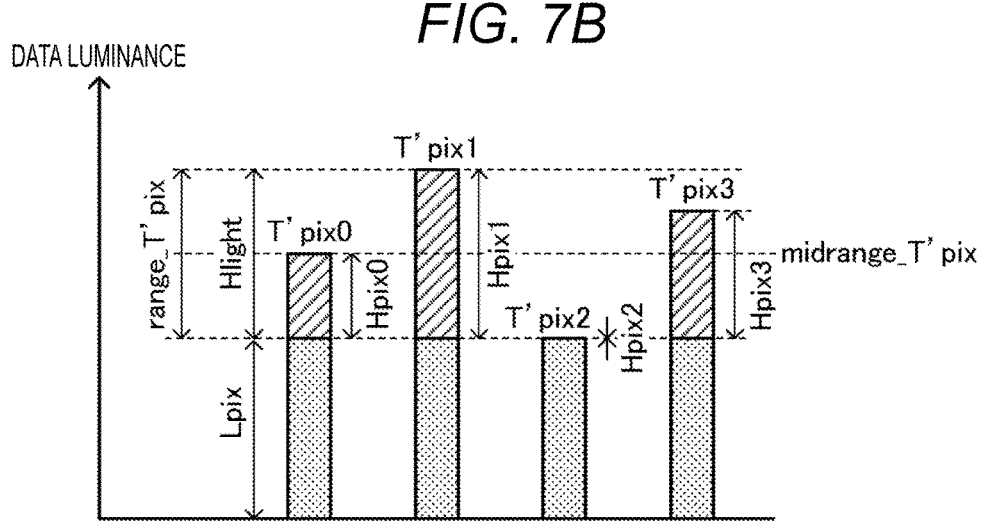

In this case, first, the image data distribution unit 209 corrects the data luminance TpixN (decreases the gradation of the target image data) to obtain the data luminance in the range almost equal to the range Hlight. In FIG. 7A, the arrow in the data luminance TpixN indicates the state in which the data luminance TpixN is corrected. FIG. 7B illustrates an example of luminance distribution in the area of one second pixel. FIG. 7B illustrates not the data luminance TpixN before the correction but data luminance T'pixN after the correction. Referring to FIG. 7B, a range range_T'pix of the data luminance T'pixN after the correction is equal to the range Hlight.

In the first embodiment, the image data distribution unit 209 decreases the gradation of the target image data to keep the average luminance of the target image data. Specifically, the image data distribution unit 209 corrects the data luminance TpixN such that an average ave_T'pix of the data luminances T'pix0 to 3 is almost equal to an average ave_Tpix of the data luminances Tpix0 to 3. To make the data luminance ave_T'pix almost equal to the data luminance ave_Tpix, the gradation is compressed almost centered on the data luminance ave_Tpix. In the first embodiment, the image data distribution unit 209 calculates correction ratio ratio1 by Equation 4 and calculates the data luminance T'pixN by Equation 5 as follows:

$$\text{ratio1} = H\text{light}/\text{range}\_T\text{pix} \quad \text{(Equation 4)}$$

$$T'\text{pix}N = (T\text{pix}N - \text{ave}\_T\text{pix}) \times \text{ratio1} + \text{ave}\_T\text{pix} \quad \text{(Equation 5)}$$

Next, the image data distribution unit 209 performs the same operation as in the case of the range range_Tpix≤the range Hlight, using the data luminance T'pixN instead of the data luminance TpixN. Accordingly, the display luminances HpixN and Lpix are calculated. Specifically, the display luminances HpixN and Lpix are calculated by Equations 6 to 8 described below instead of Equations 1 to 3. In Equation 6, "midrange_T'pix" represents the middle value of the range of the data luminances T'pix0 to T'pix3, "max_T'pix" represents the maximum value among the data luminances T'pix0 to T'pix3, and min_T'pix is the minimum value among the data luminances T'pix0 to T'pix3. FIG. 7B also describes the calculated display luminances HpixN and Lpix.

$$\text{midrange}\_T'\text{pix} = (\max\_T'\text{pix} + \min\_T'\text{pix})/2 \quad \text{(Equation 6)}$$

$$L\text{pix} = \text{midrange}\_T'\text{pix} - H\text{light}/2 \quad \text{(Equation 7)}$$

$$H\text{pix}N = T'\text{pix}N - L\text{pix} \quad \text{(Equation 8)}$$

Figure 8:
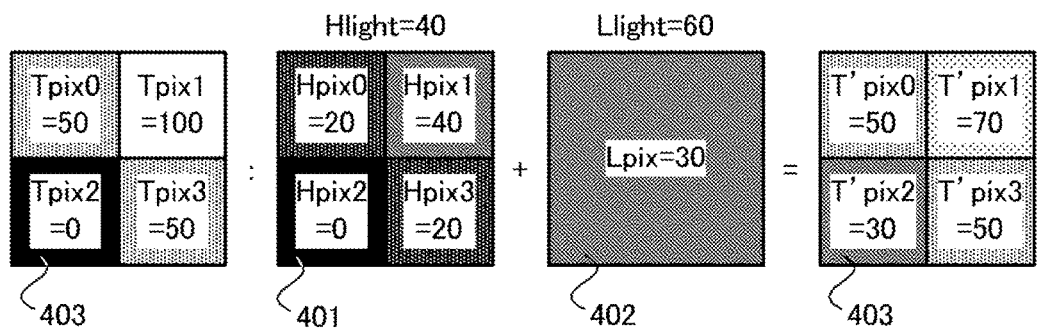
FIG. 8 is a diagram of an example of luminances (display luminance and data luminance) according to one or more aspects.

FIG. 8 illustrates an example of luminance distribution in the area of one second pixel. FIG. 8 provides specific values of the luminances. In the example of FIG. 8, the data luminance Tpix0 is 50, the data luminance Tpix1 is 100, the data luminance Tpix2 is 0, and the data luminance Tpix3 is 50. Accordingly, the data luminance max_Tpix is 100 (=Tpix1), and the data luminance min_Tpix is 0 (=Tpix2). The range range_Tpix is 100 (=100-0), the light emission luminance Hlight is 40. In this case, the range range_Tpix=100 is wider than the range Hlight=40, the display luminances Lpix and HpixN are calculated by Equations 4 to 8.

In the example of FIG. 8, the correction ratio ratio1 is 0.4 (=Hlight/range_Tpix=40/100). The data luminance ave_Tpix is 50 (=(Tpix0+Tpix1+Tpix2+Tpix3)/4=(50+100+0+50)/4). Accordingly, the data luminance T'pix0=(Tpix0−ave_Tpix)×ratio1+ave_Tpix=(50-50)×0.4+50=50 is calculated by Equation 5. Similarly, the data luminance T'pix1=70, the data luminance T'pix2=30, and the data luminance T'pix3=50 are calculated. The range range_T'pix is 40 (=max_T'pix−min_T'pix=T'pix1−T'pix2=70-30), which is equal to the range Hlight=40. The data luminance ave_T'pix is 50 (=(T'pix0+T'pix1+T'pix2+T'pix3)/4=(50+70+30+50)/4), which is equal to the data luminance ave_Tpix=50. The data luminance midrange_T'pix is 50 (=(max_T'pix+min_T'pix)/2=(70+30)/2). Accordingly, the display luminance Lpix=midrange_T'pix−Hlight/2=50-40/2=30 is calculated. Then, Hpix0=T'pix0−Lpix=50-30=20, Hpix1=T'pix1−Lpix=70-30=40, Hpix2=30-30=0, and Hpix3=50-30=20 are calculated.

In the range range_Tpix>the range Hlight, the display luminance equal to the data luminance TpixN cannot be achieved, thereby resulting in degradation of image quality of the display images. In the first embodiment, however, the gradation of the target image data is decreased while keeping the average luminance of the target image data to suppress the degradation of image quality. In addition, in the first embodiment, it is determined whether the range range_Tpix is wider than the range Hlight for each of the plurality of areas. Then, the gradation is decreased only in the areas in which it is determined that "the range range_Tpix is wider than the range Hlight." Since the gradation is decreased in limited areas, it is possible to suppress the degradation of the image quality. In the first embodiment, additionally, it is determined whether the range range_Tpix is wider than the range Hlight for each of the plurality of very small areas. Specifically, it is determined whether the range range_Tpix is wider than the range Hlight for each of the plurality of areas formed from four first pixels. There hardly occur steep changes in the data luminance TpixN with the range range_Tpix wider than the range Hlight in very small areas. In particular, in natural images, there rarely occur seep changes in the data luminance TpixN in very small areas. Accordingly, the degradation of image quality is unlikely to occur.

The display of the first image can be controlled using the first image data generated by the foregoing method such that the gradation almost equal to the gradation of the target image data is achieved by the first image. The display of the second image can be controlled using the second image data generated by the foregoing method such that the second image is used as an image for enhancing the luminance and contrast of the display image. The intended use of the second images is limited to the enhancement of the display luminance, the improvement of the contrasts of the display image, and the like, thereby to display a favorable image (high resolution, high luminance, high contrast, and the like) as a target image.

As described above, according to the first embodiment, a target image can be favorably displayed in a simple configuration in which stack projection is performed by the first projection device displaying the first image with the first resolution and the second projection device displaying the second image with resolution lower than the first resolution. For example, in the first embodiment, a target image can be favorably displayed by a small number of projection devices. In addition, the upper limit of the resolution of images displayable by the second projection device can be low, and thus a low-cost projection device can be used as the second projection device to reduce the cost for the display system.

As the first light emission unit, one first light source unit corresponding to the projection area may be used. As the second light emission unit, one second light source unit corresponding to the projection area may be used. In such a configuration as well, the light emission luminance can be controlled based on the target image data to improve the contrast in a temporal direction for display of moving images. The light emission luminance of the first light emission unit, the light emission luminance of the second light emission unit, and the like may have predetermined fixed values. In such a configuration as well, it is possible to display the target image with high resolution, high luminance, and the like.

In the first embodiment, the data for display of the target image (the first image data, the first light source control values, the second image data, the second light source control values, and the like) are generated at the time of display of the target image. However, the present disclosure is not limited to this. For example, the image distribution device 103 may generate and record in advance the data for display of the target image. The image distribution device 103 may output the stored data to the first projection device 101 and the second projection device 102 at the time of display of the target image.

Second Embodiment

Hereinafter, a second embodiment of the present disclosure will be described. In the first embodiment, stack projection is performed. In the second embodiment, stack projection and tile projection are combined. In the following description, differences from the first embodiment (configuration, operation, and the like) will be discussed in detail and descriptions of the same points as those of the first embodiment will be omitted.

Figure 9:
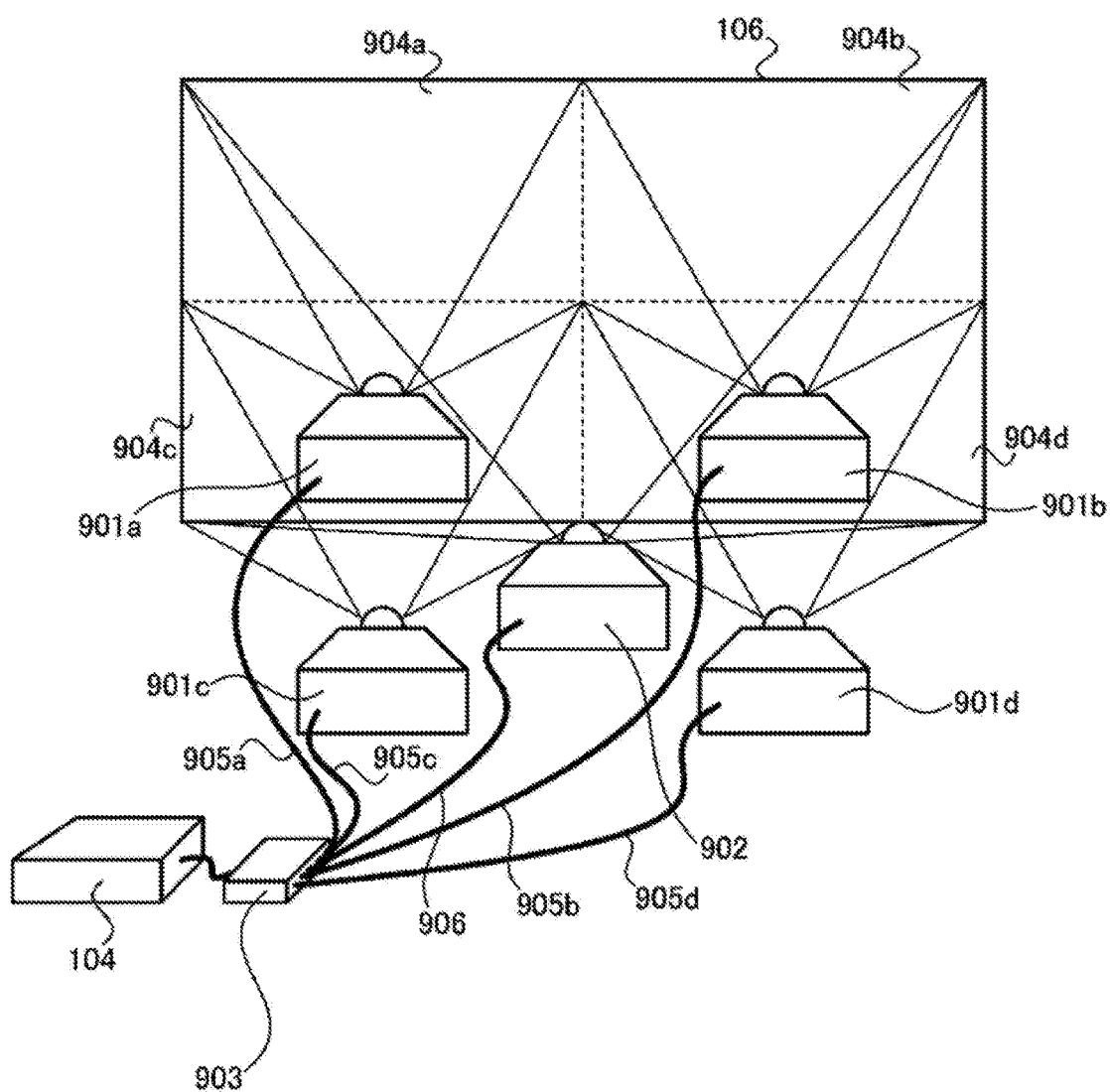
FIG. 9 is a diagram of a broad configuration example of a display system according to one or more aspects.

FIG. 9 is a diagram of a broad configuration example of a display system according to the second embodiment. The display system according to the second embodiment has four first projection devices 901a to 901d, a second projection device 902, an image distribution device 903, and an image output device 104. The image output device 104 illustrated in FIG. 9 is the same as the image output device 104 illustrated in FIG. 1, the screen 106 illustrated in FIG. 9 is the same as the screen 106 illustrated in FIG. 1. The first projection devices 901a to 901d and the second projection device 902 are equal in performance (the upper limit of resolution of displayable images and the like). There are no particular limitations on the number of the first projection devices and the number of the second projection devices, and the like.

The image distribution device 903 is connected to the four first projection devices 901a to 901d, the second projection device 902, and the image output device 104. The image distribution device 903 is connected to the first projection device 901a using a cable 905a. The image distribution device 903 is connected to the first projection device 901b using a cable 905b. The image distribution device 903 is connected to the first projection device 901c using a cable 905c. The image distribution device 903 is connected to the first projection device 901d using a cable 905d. The image distribution device 903 is connected to the second projection device 902 using a cable 906.

In the second embodiment, the four first projection devices 901a to 901d are arranged such that the four first projection devices 901a to 901d can perform tile projection. Specifically, two horizontal×two vertical, total four projection areas 904a to 904d are associated with the four first projection devices 901a to 901d. The four projection areas 904a to 904d constitute part of or all the screen 106. There is no particular limitation on the layout of the projection areas 904a to 904d.

The first projection device 901a performs projection onto the projection area 904a to display a first image with 4K resolution in the projection area 904a. The first projection device 901b performs projection onto the projection area 904b to display a first image with 4K resolution in the projection area 904b. The first projection device 901c performs projection onto the projection area 904c to display a first image with 4K resolution in the projection area 904c. The first projection device 901d performs projection onto the projection area 904d to display a first image with 4K resolution in the projection area 904d. The first images are different among the four first projection devices 901a to 901d. The four first projection devices 901a to 901d display the four first images to display an image with 8K resolution in a composite projection area. The composite projection area is composed of the four projection areas 904a to 904d. The 8K resolution is a resolution of 7860 horizontal×4320 vertical pixels, for example.

In the second embodiment, the four first projection devices 901a to 901d and the one second projection device 902 are arranged such that the four first projection devices 901a to 901d and the one second projection device 902 perform stack projection. Specifically, the second projection device 902 performs projection onto the composite projection area to display a second image with 4K resolution in the composite projection area. In the second embodiment, the second image is an image based on down-converted image data.

The first projection device 901a has a first light emission unit and a first projection unit that modulates light emitted from the first light emission unit and projects the modulated light onto the projection area 904a. The first projection device 901b has a first light emission unit and a first projection unit that modulates light emitted from the first light emission unit and projects the modulated light onto the projection area 904b. The first projection device 901c has a first light emission unit and a first projection unit that modulates light emitted from the first light emission unit and projects the modulated light onto the projection area 904c. The first projection device 901d has a first light emission unit and a first projection unit that modulates light emitted from the first light emission unit and projects the modulated light onto the projection area 904d. The second projection device 902 has a second light emission unit and a second projection unit that modulates light emitted from the second light emission unit and projects the modulated light onto the composite projection area.

The first light emission unit of the first projection device 901a has a plurality of first light source units corresponding to a plurality of first areas constituting the projection area 904a. The first light emission unit of the first projection device 901b has a plurality of first light source units corresponding to a plurality of first areas constituting the projection area 904b. The first light emission unit of the first projection device 901c has a plurality of first light source units corresponding to a plurality of first areas constituting the projection area 904c. The first light emission unit of the first projection device 901d has a plurality of first light source units corresponding to a plurality of first areas constituting the projection area 904d. The second light emission unit of the second projection device 902 has a plurality of second light source units corresponding to a plurality of second areas constituting the composite projection area. In the second embodiment, the light emission luminances of the first light source units are individually controlled, and the light emission luminances of the second light source units are individually controlled.

In the second embodiment, five horizontal×three vertical, total 15 areas are used as the plurality of first areas constituting the projection area 904a. Similarly, five horizontal×three vertical, total 15 areas are used as the plurality of first areas constituting the projection area 904b, five horizontal×three vertical, total 15 areas are used as the plurality of first areas constituting the projection area 904c, and five horizontal×three vertical, total 15 areas are used as the plurality of first areas constituting the projection area 904d. In addition, five horizontal×three vertical, total 15 areas are used as the plurality of second areas constituting the composite projection area.

In the second embodiment, the image distribution device 903 and the image output device 104 can process image data with the 8K resolution and lower resolutions. In the second embodiment, the image output device 104 outputs target image data with 8K resolution to the image distribution device 903. The image distribution device 903 controls display by the projection devices (the first projection devices 901a to 901d and the second projection device 902) connected to the image distribution device 903 based on the target image data output from the image output device 104.

Figure 15A:
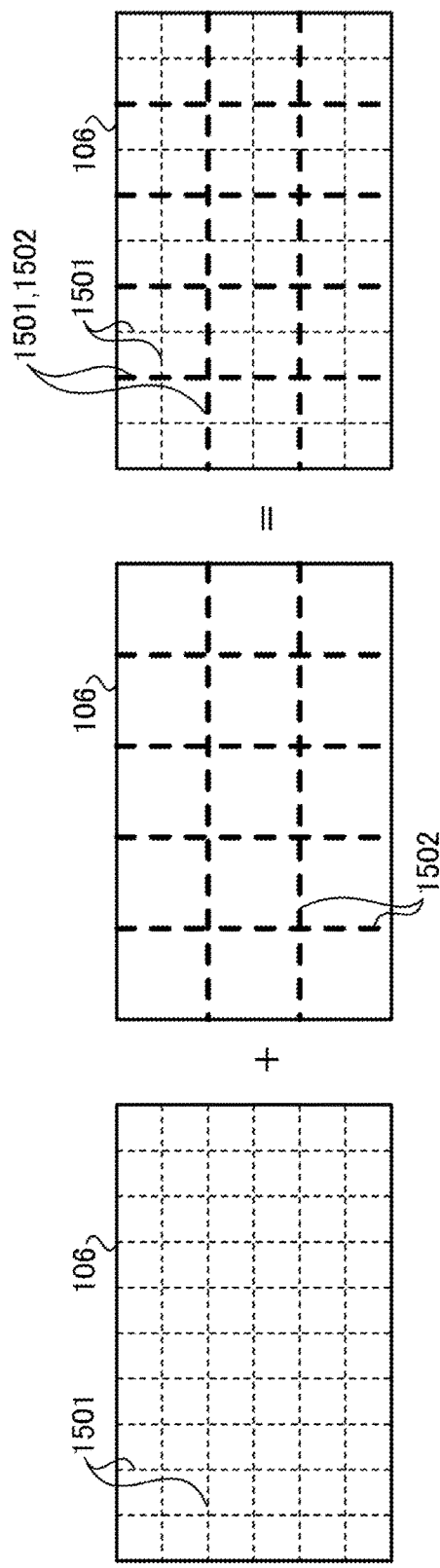
FIGS. 15A and 15B are diagrams of examples of first areas, second areas, a first image, and a second image according to one or more aspects.

FIG. 15A illustrates an example of first areas and second areas on the screen 106. FIG. 15A illustrates the first areas, the second areas, and an overlap of the first areas and the second areas in this order. Referring to FIG. 15A, narrow dashed lines 1501 indicate the boundaries between the plurality of first areas, and thick dashed lines 1502 indicate the boundaries between the plurality of second areas. As described above, in the second embodiment, two horizontal×two vertical, total four projection areas 904a to 904d are used. Each of the four projection areas 904a to 904d is formed from five horizontal×three vertical, total 15 first areas. Accordingly, FIG. 15A illustrates 10 horizontal×six vertical, total 60 first areas. In addition, as illustrated in FIG. 15A, in the second embodiment, five horizontal×three vertical, total 15 areas are used as the plurality of second areas constituting the composite projection area. The area formed from the total 60 first areas is the composite projection area formed from the 15 second areas. Accordingly, when the first areas and the second areas overlap, the thick dashed lines 1502 coincide with the narrow dashed lines 1501. As illustrated in FIG. 15A, each of the second areas is formed from two horizontal×two vertical, total four first areas. There are no particular limitations on the number of the first areas and layout of the first areas in each of the second areas and others.

Figure 15B:
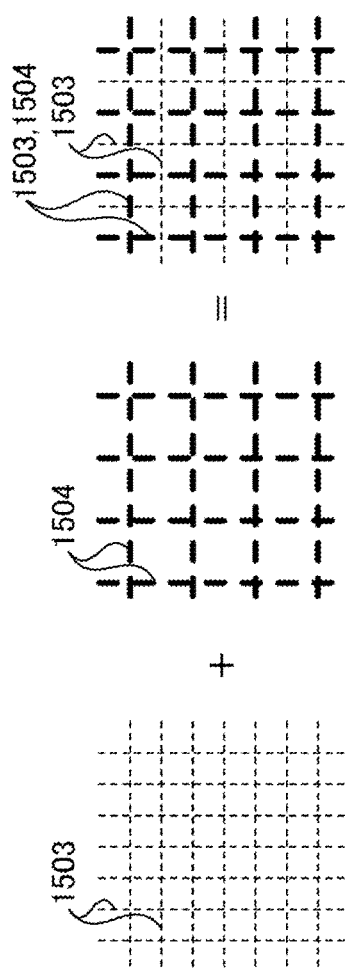

FIG. 15B is a diagram of an example of the first image and the second image on the screen 106. FIG. 15B illustrates the first image, the second image, and an overlap of the first image and the second image in this order. Referring to FIG. 15B, narrow dashed lines 1503 indicate the boundaries between a plurality of first pixels, and thick dashed lines 1504 indicate the boundaries between a plurality of second pixels. As described above, in the second embodiment, the resolution of the first image and the resolution of the second image are both 4K resolution. However, the first image is displayed in each of the two horizontal×two vertical, total four projection areas 904a to 904d, whereas the second image is displayed in the composite projection area (formed from the four projection areas 904a to 904d). Accordingly, the resolution of the second image is lower than the resolution of the first image in each of the four projection areas 904a to 904d. Specifically, in each of the four projection areas 904a to 904d, the horizontal resolution of the second image is ½ of the horizontal resolution of the first image, and the vertical resolution of the second image is ½ of the vertical resolution of the first image. Therefore, as in the first embodiment (see FIG. 14B), in the overlap of the first image and the second image, the thick dashed lines 1504 coincide with the narrow dashed lines 1503, and the two horizontal×two vertical, total four first pixels are included in each of the plurality of areas corresponding to the plurality of second pixels.

Figure 10:
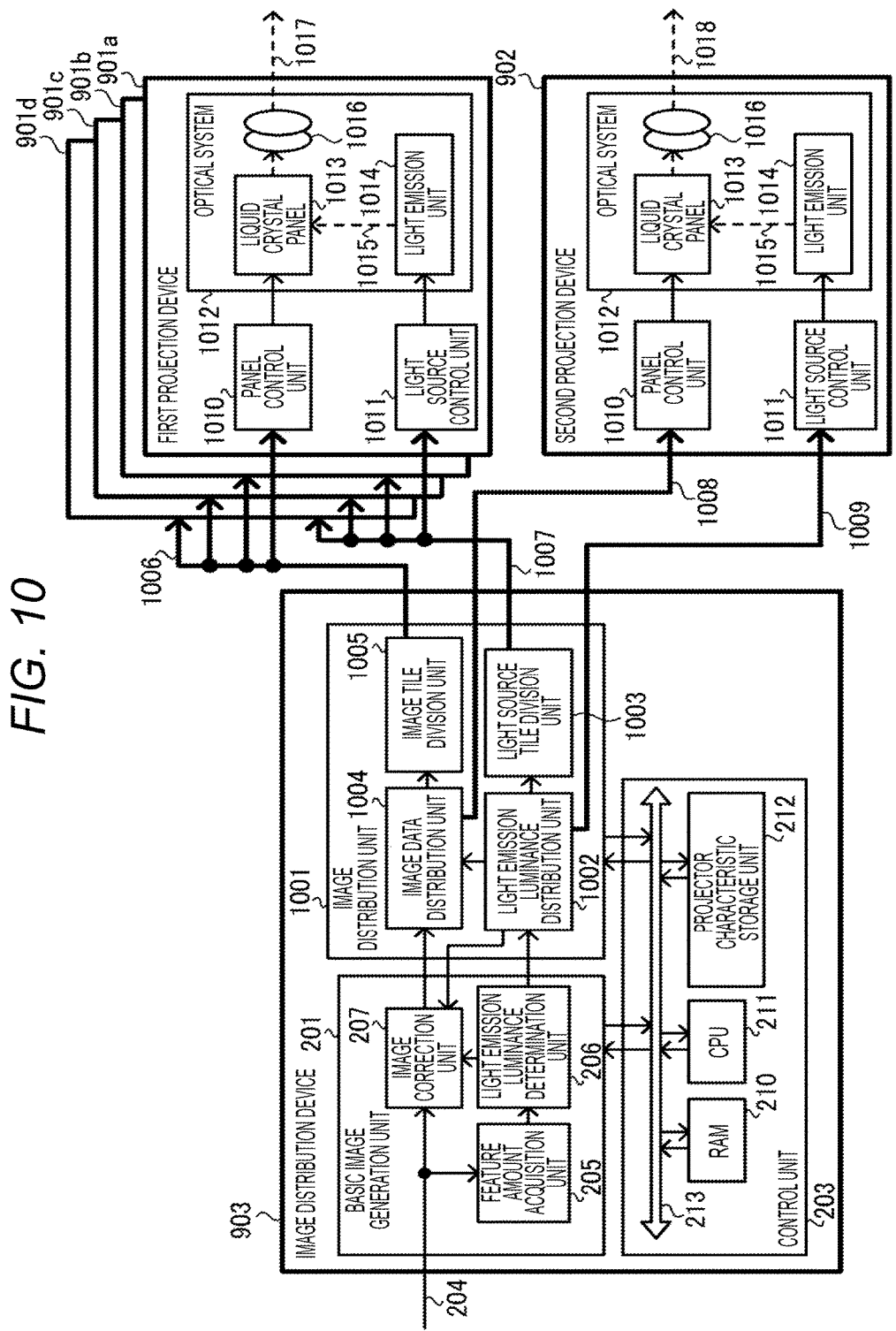
FIG. 10 is a diagram of a configuration example of the display system according to one or more aspects.

FIG. 10 is a block diagram of a configuration example of the display system according to the second embodiment. FIG. 10 does not illustrate the image output device 104 and the screen 106. In FIG. 10, the same reference signs as those in the first embodiment (see FIG. 2) are given to the same functional units as those in the first embodiment. The image distribution device 903 is connected to the four first projection devices 901a to 901d using an image data transmission bus 1006 and a light source control value transmission bus 1007. Each of the image data transmission bus 1006 and the light source control value transmission bus 1007 is formed by binding four buses. The image distribution device 903 is connected to each of the four first projection devices 901a to 901d using the four buses in the image data transmission bus 1006. Similarly, the image distribution device 903 is connected to each of the four first projection devices 901a to 901d using the four buses in the light source control value transmission bus 1007. The image distribution device 903 is also connected to the second projection device 902 using an image data transmission bus 1008 and a light source control value transmission bus 1009. Each of the four first projection devices 901a to 901d outputs light 1017. The light 1017 output from each of the four first projection devices 901a to 901d is applied to the screen 106 to display four first images on the screen 106. The second projection device 902 outputs light 1018. The light 1018 is applied to the screen 106 to display the second image on the screen 106.

The functional units of the image distribution device 903 will be described.

An image distribution unit 1001 has the same function as that of the image distribution unit 202 in the first embodiment. However, in the second embodiment, the image distribution unit 1001 performs operations allowing for the respective display characteristics of the four first projection devices 901a to 901d and the display characteristic of the second projection device 902. The image distribution unit 1001 generates first image data, first light source control values, second image data, and second light source control values from the light emission luminances and the basic image data output from the basic image generation unit 201 based on the foregoing five display characteristics. The first image data and the first light source control value are generated for each of the four first projection devices 901a to 901d.

The image distribution unit 1001 outputs the first image data corresponding to the first projection device 901a to the first projection device 901a via the image data transmission bus 1006. Similarly, the image distribution unit 1001 outputs the first image data corresponding to the first projection device 901b to the first projection device 901b via the image data transmission bus 1006, outputs the first image data corresponding to the first projection device 901c to the first projection device 901c via the image data transmission bus 1006, and outputs the first image data corresponding to the first projection device 901d to the first projection device 901d via the image data transmission bus 1006. In addition, the image distribution unit 1001 outputs the second image data to the second projection device 902 via the image data transmission bus 1008.

The image distribution unit 1001 outputs the first light source control value corresponding to the first projection device 901a to the first projection device 901a via the light source control value transmission bus 1007. Similarly, the image distribution unit 1001 outputs the first light source control value corresponding to the first projection device 901b to the first projection device 901b via the light source control value transmission bus 1007, outputs the first light source control value corresponding to the first projection device 901c to the first projection device 901c via the light source control value transmission bus 1007, and outputs the first light source control value corresponding to the first projection device 901d to the first projection device 901d via the light source control value transmission bus 1007. In addition, the image distribution unit 1001 outputs the second light source control value to the second projection device 902 via the light source control value transmission bus 1009.

The image distribution unit 1001 has a light emission luminance distribution unit 1002, a light source tile division unit 1003, an image data distribution unit 1004, and an image tile division unit 1005.

The light emission luminance distribution unit 1002 has the same function as that of the light emission luminance distribution unit 208 in the first embodiment. However, in the second embodiment, the second area is formed from two or more first areas (specifically, four first areas), and the sum of the light emission luminance Hlight and the light emission luminance Llight may not be almost equal to the light emission luminance Tlight. Accordingly, the light emission luminance distribution unit 1002 generates the first light source control values and the second light source control value by a method different from that used by the light emission luminance distribution unit 208. For example, when the sum of the light emission luminance Hlight and the light emission luminance Llight cannot be almost equal to the light emission luminance Tlight, the light emission luminance distribution unit 1002 corrects the light emission luminance Tlight to obtain light emission luminance T'light. Then, the light emission luminance distribution unit 1002 generates the first light source control values and the second light source control value based on the light emission luminance T'light.

The light emission luminance distribution unit 1002 outputs the generated first light source control values to the light source tile division unit 1003, and outputs the generated second light source control value to the second projection device 902. The light emission luminance distribution unit 1002 also outputs the information on the light emission luminance Tlight to the image correction unit 207. However, when the light emission luminance Tlight is corrected, the light emission luminance distribution unit 1002 outputs the information on the light emission luminance T'light as the corrected light emission luminance, instead of the information on the light emission luminance Tlight, to the image correction unit 207.

The image correction unit 207 in the second embodiment has the same function as that of the image correction unit 207 in the first embodiment. However, in the second embodiment, the light emission luminance distribution unit 1002 may correct the light emission luminance Tlight. When the light emission luminance Tlight is corrected, it is preferable to generate the basic image data using the light emission luminance T'light as the corrected light emission luminance instead of the light emission luminance Tlight. Accordingly, the image correction unit 207 generates the basic image data using the light emission luminance (the light emission luminance Tlight or the light emission luminance T'light) output from the light emission luminance distribution unit 1002.

The light source tile division unit 1003 divides the plurality of first light source control values output from the light emission luminance distribution unit 1002. In the second embodiment, the 60 first light source control values are divided into four first light source control value groups corresponding to the four first projection devices 901a to 901d. Each of the first light source control value groups includes 15 first light source control values. The first light source control values corresponding to the first projection device 901a are first light source control values for the first light source corresponding to the projection area 904a (the first area of the projection area 904a). Similarly, the first light source control values corresponding to the first projection device 901b are first light source control values for the first light source corresponding to the projection area 904b, the first light source control values corresponding to the first projection device 901c are first light source control values for the first light source corresponding to the projection area 904c, and the first light source control values corresponding to the first projection device 901d are first light source control values for the first light source corresponding to the projection area 904d. The light source tile division unit 1003 outputs the first light source control values corresponding to the first projection device 901a to the first projection device 901a, and outputs the first light source control values corresponding to the first projection device 901b to the first projection device 901b. The light source tile division unit 1003 outputs the first light source control values corresponding to the first projection device 901c to the first projection device 901c, and outputs the first light source control values corresponding to the first projection device 901d to the first projection device 901d.

The image data distribution unit 1004 has the same function as that of the image data distribution unit 209 in the first embodiment. The image data distribution unit 1004 generates image data with 8K resolution (8K image data) and second image data with 4K resolution by the same method as that used by the image data distribution unit 209. The 8K image data corresponds to the first image data in the first embodiment. The image data distribution unit 1004 outputs the 8K image data to the image tile division unit 1005 and outputs the second image data to the second projection device 902.

The image tile division unit 1005 divides the 8K image data output from the image data distribution unit 1004 into four first image data (image data with 4K resolution) corresponding to the four first projection devices 901a to 901d. The first image data corresponding to the first projection device 901a is the image data corresponding to the projection area 904a. Similarly, the first image data corresponding to the first projection device 901b is the image data corresponding to the projection area 904b, the first image data corresponding to the first projection device 901c is the image data corresponding to the projection area 904c, and the first image data corresponding to the first projection device 901d is the image data corresponding to the projection area 904d. The image tile division unit 1005 outputs the first image data corresponding to the first projection device 901a to the first projection device 901a, and outputs the first image data corresponding to the first projection device 901b to the first projection device 901b. The light source tile division unit 1003 outputs the first image data corresponding to the first projection device 901c to the first projection device 901c, and outputs the first image data corresponding to the first projection device 901d to the first projection device 901d. The first projection device 901a, the first projection device 901b, the first projection device 901c, the first projection device 901d, and the second projection device 902 are identical in configuration. Each of these projection devices has a panel control unit 1010, a light source control unit 1011, and an optical system 1012. The optical system 1012 has a liquid crystal panel 1013, a light emission unit 1014, and a projection lens 1016. The panel control unit 1010 has the same function as that of the panel control unit 218 in the first embodiment, the light source control unit 1011 has the same function as that of the light source control unit 219 in the first embodiment, and the optical system 1012 has the same function as that of the optical system 220 in the first embodiment. The liquid crystal panel 1013 has the same function as that of the liquid crystal panel 221 in the first embodiment, the light emission unit 1014 has the same function as that of the first light emission unit 222 in the first embodiment, and the projection lens 1016 has the same function as that of the projection lens 224 in the first embodiment. Light 1015 corresponds to the light 223 and 231 in the first embodiment.

Figure 11:
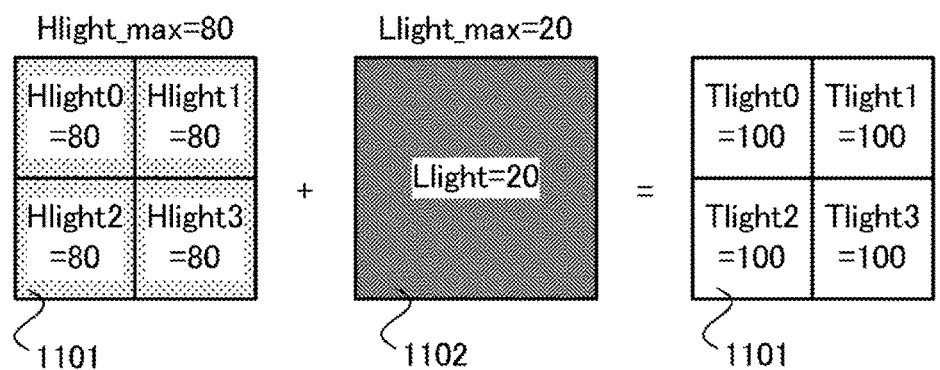
FIG. 11 is a diagram of an example of light emission luminance according to one or more aspects.

An example of operation of the light emission luminance distribution unit 1002 will be described. In the second embodiment, the light emission luminance distribution unit 1002 performs the following operation on each of the second areas. FIG. 11 illustrates an example of the light emission luminances Hlight of the first light source units, the light emission luminance Llight of the second light source units, and the light emission luminances Tlight determined by the light emission luminance determination unit 206. FIG. 11 is a diagram of one second area. Accordingly, FIG. 11 illustrates one second area 1102 and four first areas 1101 included in the second area 1102.

Hereinafter, the light emission luminance Hlight of the upper left first area 1101 will be described as "Hlight0," and the light emission luminance Hlight of the upper right first area 1101 will be described as "Hlight1." The light emission luminance Hlight of the lower left first area 1101 will be described as "Hlight2," and the light emission luminance Hlight of the lower right first area 1101 will be described as "Hlight3." The light emission luminance Tlight of the upper left first area 1101 will be described as "Tlight0," and the light emission luminance Tlight of the upper right first area 1101 will be described as "Tlight1." The light emission luminance Tlight of the lower left first area 1101 will be described as "Tlight2," and the light emission luminance Tlight of the lower right first area 1101 will be described as "Tlight3."

FIG. 11 illustrates the case where the light emission luminance HlightN is the upper limit Hlight_max=80 of the light emission luminance HlightN and the light emission luminance Llight is the upper limit Llight_max=20 of the light emission luminance Llight. In the second embodiment, the first area 1101 radiated with the light from the first light source unit is smaller than the second area 1102 radiated with the light from the second light source unit. The first projection devices 901a to 901d and the second projection device 902 are equal in performance. When the projection devices are constant in performance, the upper limit of the arrival luminance of the light emitted from the light source unit (the luminance at the time of arrival at the area (the screen 106)) is higher as the area irradiated with the light emitted from the light source unit is smaller. Accordingly, in the second embodiment, as the light emission luminance Hlight_max, the light emission luminance 80 higher than the light emission luminance Llight=20 is used. There are no particular limitations on the performance of the projection devices. For example, a projection device higher in performance than the first projection devices 901a to 901d may be used as the second projection device 902 so that the ratio of the light emission luminance Llight_max to the light emission luminance Hlight_max increases.

As with the light emission luminance distribution unit 208 in the first embodiment, the light emission luminance distribution unit 1002 determines the light emission luminances Hlight and Llight such that "TlightN=HlightN+Llight" can be satisfied. Referring to FIG. 11, "TlightN=HlightN+Llight" is satisfied in all the four first areas 1101. There exists a plurality of combinations of the light emission luminance HlightN and the light emission luminance Llight satisfying "TlightN=HlightN+Llight." As with the light emission luminance distribution unit 208, the light emission luminance distribution unit 1002 determines the light emission luminance HlightN and the light emission luminance Llight such that the light emission luminance is assigned to the first light source units on a higher priority than the second light source units.

In this case, the range of the light emission luminances Tlight0 to Tlight3 will be described as "range_Tlight." The range range_Tlight is obtained by subtracting the minimum value among the light emission luminances Tlight0 to Tlight3 from the maximum value among the light emission luminances Tlight0 to Tlight3. In the second embodiment, the range of the light emission luminance 0 to the light emission luminance Hlight_max is set to the upper limit of the range of the light emission luminance of the first light source. Therefore, the value of the upper limit of the range of the light emission luminance of the first light source is equal to the value of the light emission luminance Hlight_max.

When the range range_Tlight is equal to or less than the range (the light emission luminance) Hlight_max, "TlightN=HlightN+Lpix" can be satisfied in all the four first areas 1101. Accordingly, in this case, the light emission luminance distribution unit 1002 determines the light emission luminances HlightN and Llight such that "TlightN=HlightN+Lpix" can be satisfied.

Meanwhile, when the range range_Tlight is wider than the range Hlight_max, "TlightN=HlightN+Llight" cannot be satisfied in at least any of the four first areas 1101. Accordingly, in this case, the light emission luminance distribution unit 1002 corrects the light emission luminances Tlight0 to Tlight4 to obtain four light emission luminances T'light0 to T'light3 in a range almost equal to the range Hlight. Then, the light emission luminance distribution unit 1002 determines the light emission luminances HlightN and Llight based on the light emission luminances T'light0 to T'light3. The light emission luminance T'light0 is a light emission luminance obtained by correcting the light emission luminance Tlight0, and the light emission luminance T'light1 is a light emission luminance obtained by correcting the light emission luminance Tlight1. The light emission luminance T'light2 is a light emission luminance obtained by correcting the light emission luminance Tlight2, and the light emission luminance T'light3 is a light emission luminance obtained by correcting the light emission luminance Tlight3.

Figure 12:
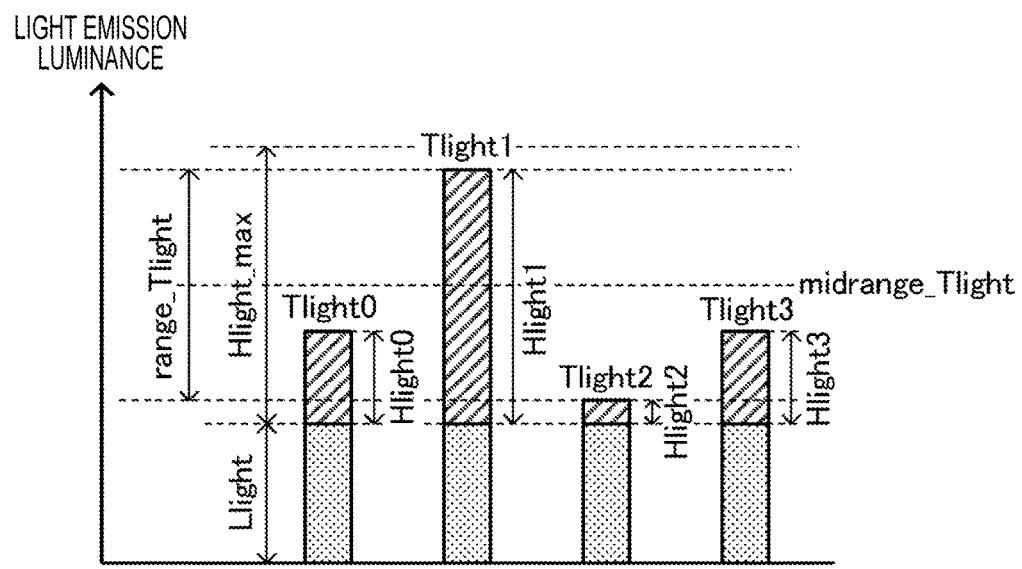
FIG. 12 is a diagram of an example of light emission luminance according to one or more aspects.

A specific example of operation of the light emission luminance distribution unit 1002 will be described. First, the case in which the range range_Tlight≤the range Hlight_max will be described. FIG. 12 illustrates an example of luminance distribution in one second area 1102. In the example of FIG. 12, the maximum value max_Tlight among the light emission luminances Tlight0 to Tlight3 is the light emission luminance Tlight1, and the minimum value min_Tlight among the light emission luminances Tlight0 to Tlight3 is the light emission luminance Tlight2. Accordingly, the range range_Tlight is the light emission luminance Tlight1−the light emission luminance Tlight2 (=the maximum value max_Tlight−the minimum value min_Tlight). In the example of FIG. 12, the range range_Tlight is narrower than the range Hlight_max.

In this case, the light emission luminances HlightN and Llight are determined such that variations in the light emission luminance HlightN with respect to the light emission luminance Hlight_max/2 are almost equal to variations in the light emission luminance TlightN with respect to the middle of the range of the light emission luminance TlightN. The light emission luminance Hlight_max/2 is in the middle of the upper limit of the range of the light emission luminance HlightN.

First, the light emission luminance distribution unit 1002 calculates the middle value midrange_Tlight of the range of the light emission luminances Tlight0 to Tlight3. The light emission luminance midrange_Tlight is calculated by Equation 9 shown below. In the example of FIG. 12, as the light emission luminance midrange_Tlight, (the light emission luminance Tlight1+the light emission luminance Tlight2)/2 is calculated.

midrange_$T$light=(max_$T$light+min_$T$light)/2 (Equation 9)

Next, in the case in which the light emission luminance HlightN is the light emission luminance Hlight_max/2, the light emission luminance distribution unit 1002 determines the light emission luminance Llight such that the light emission luminance HlightN+Llight is almost equal to the light emission luminance midrange_Tlight. Specifically, the light emission luminance distribution unit 1002 calculates the light emission luminance Llight by Equation 10 as follows:

$L$light=midrange_$T$light−$H$light_max/2 (Equation 10)

Then, the light emission luminance distribution unit 1002 subtracts the light emission luminance Llight from the light emission luminance TlightN as shown in Equation 11 to calculate the light emission luminance HlightN as follows:

$H$light$N$=$T$light$N$−$L$light (Equation 11)

Figure 13A:
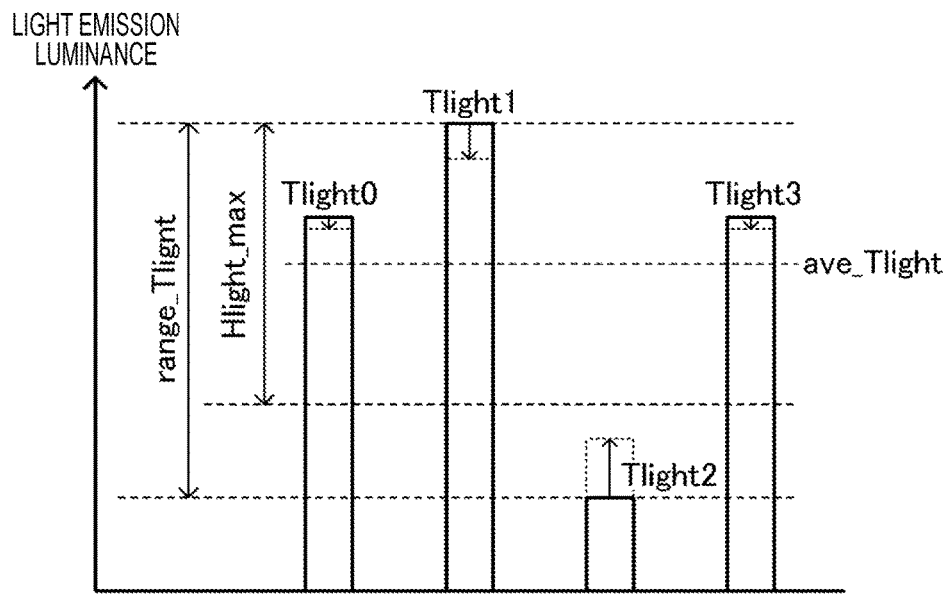
FIGS. 13A and 13B are diagrams of examples of light emission luminance according to one or more aspects.

The case in which the range range_Tlight>the range Hlight_max will be described. FIG. 13A illustrates an example of luminance distribution in one second area 1102. In the example of FIG. 13A as well, the light emission luminance max_Tlight is the light emission luminance Tlight1, the light emission luminance min_Tlight is the light emission luminance Tlight2, and the range range_Tlight is the light emission luminance Tlight1−the light emission luminance Tlight2. However, in the example of FIG. 13A, the range range_Tlight is wider than the range Hlight_max.

Figure 13B:
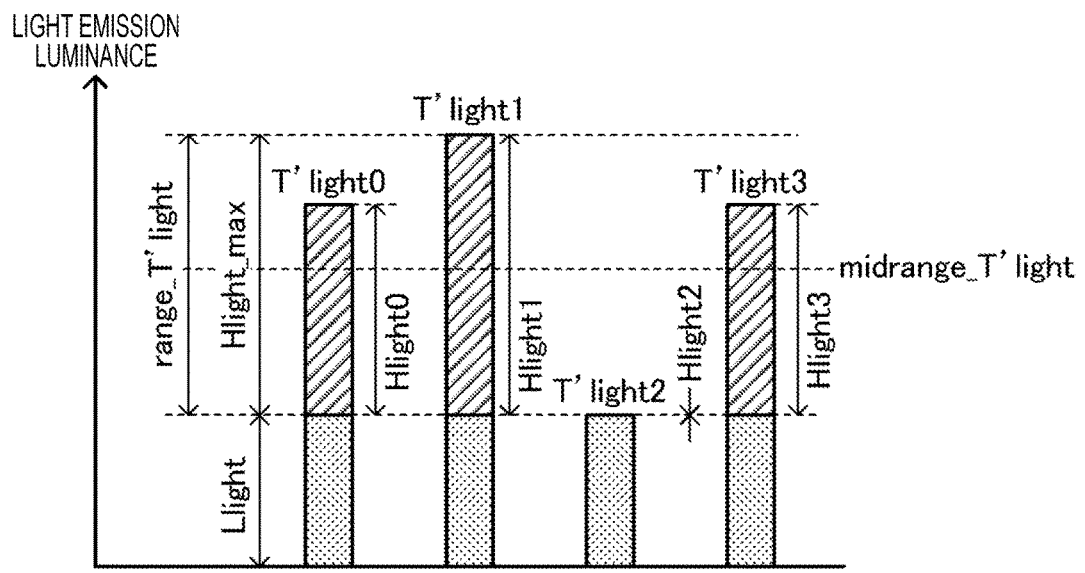

In this case, first, the light emission luminance distribution unit 1002 corrects the light emission luminance TlightN to obtain the light emission luminance in a range almost equal to the range Hlight_max. In FIG. 13A, the arrow in the light emission luminances TlightN indicates the state in which the light emission luminances TlightN is corrected. FIG. 13B illustrates an example of luminance distribution in one second area 1102. FIG. 13B illustrates light emission luminance T'lightN after the correction, not the light emission luminance TlightN before the correction. Referring to FIG. 13B, the range range_T'light of the light emission luminances T'lightN after the correction is equal to the range Hlight_max.

In the second embodiment, the light emission luminance distribution unit 1002 corrects the light emission luminance TlightN to keep the average of the light emission luminance TlightN. Specifically, the light emission luminance distribution unit 1002 corrects the light emission luminance TlightN such that an average ave_T'light of the light emission luminances T'light0 to T'light3 is almost equal to an average ave_Tlight of the light emission luminances Tlight0 to Tlight3. To make the light emission luminance ave_T'light almost equal to the light emission luminance ave_Tlight, luminance compression is performed almost centered on the light emission luminance ave_Tlight. In the second embodiment, the light emission luminance distribution unit 1002 calculates a correction ratio ratio2 by Equation 12 and calculates the light emission luminance T'lightN by Equation 13 as follows:

ratio2=$H$light_max/range_$T$light (Equation 12)

$T$'light$N$=($T$light$N$−ave_$T$light)×ratio2+ave_$T$light (Equation 13)

Next, the light emission luminance distribution unit 1002 performs the same operation as that in the case where the range range_Tlight≤the range Hlight_max, by the use of the light emission luminance T'lightN instead of the light emission luminance TlightN. Accordingly, the light emission luminances HlightN and Llight are calculated. Specifically, the light emission luminance distribution unit 1002 calculates the light emission luminances HlightN and Llight by Equations 14 to 16 shown below instead of Equations 9 to 11. In Equation 14, "midrange_T'light" has a middle value of the range of the light emission luminances T'light0 to T'light3, "max_T'light" is the maximum value among the light emission luminances T'light0 to T'light3, and "min_T'light" is the minimum value among the light emission luminances T'light0 to T'light3. FIG. 13B also illustrates the calculated light emission luminances HlightN and Llight.

$$\text{midrange\_}T\text{light} = (\max\_T\text{light} + \min\_T\text{light})/2 \quad \text{(Equation 14)}$$

$$L\text{light} = \text{midrange\_}T\text{light} - H\text{light\_max}/2 \quad \text{(Equation 15)}$$

$$H\text{light}N = T'\text{light}N - L\text{light} \quad \text{(Equation 16)}$$

In the area of range_Tlight>the range Hlight_max, "TlightN=HlightN+Llight" cannot be achieved. However, the display luminance is determined by the light emission luminances HlightN and Llight and the aperture ratio of the liquid crystal panel. Therefore, in the area where "TlightN=HlightN+Llight" cannot be achieved, the image data is adjusted. Accordingly, the aperture ratio is adjusted to achieve the desired display luminance.

As described above, according to the second embodiment, tile projection and stack projection are carried out in combination. Tile projection is performed using a plurality of first projection devices, and stack projection is performed using a plurality of first projection devices and one or more second projection devices. The number of the second projection devices is smaller than the number of the first projection device. Accordingly, it is possible to display a favorable corresponding image in a simple configuration with a relatively small number of projection devices. In addition, with a small number of projection devices, it is possible to reduce a burden on the user in adjusting the projection area (the position, size, and shape of the projection area).

The functional units of the devices in the first and second embodiments may be individual hardware units or not. Two or more of the functional units may be implemented by a common hardware unit. Each of functions of one functional unit may be implemented by an individual hardware unit. Two or more of functions of one functional unit may be implemented by a common hardware unit. Each of the functional units may be implemented by hardware or not. For example, the devices may have one or more processors and one or more memories storing control programs. The functions of at least one of the functional units in the devices may be implemented by the one or more processors reading the control programs from the one or more memories and executing the same.

The first and second embodiments are merely exemplifications. Other configurations obtained by modifying and altering the configurations in the first and second embodiments within the scope of the gist of the present disclosure are also included in the present disclosure. Other configurations obtained by combining the configurations in the first and second embodiments are also included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and one or more memories, and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary examples, the scope of the following claims are to be accorded the broadest interpretation so as to encompass all such modifications and equivalent structures and functions.

This application claims the benefit of priority from Japanese Patent Application No. 2016-179335, filed Sep. 14, 2016, which is hereby incorporated by reference herein in its entirety.

What is claimed is:

1. A control device connectable to a first projection device and a second projection device, wherein
    the first projection device performs projection onto a projection area in a projection surface to display a first image with a first resolution in the projection area,
    the second projection device performs projection onto the projection area to display a second image with a second resolution lower than the first resolution in the projection area,
    both the first image and the second image are displayed to display an image based on target image data in the projection area,
    the first projection device includes a first light emission unit and a first projection unit configured to modulate light emitted from the first light emission unit and project the modulated light onto the projection area, and
    the second projection device includes a second light emission unit and a second projection unit configured to modulate light emitted from the second light emission unit and project the modulated light onto the projection area,
    the control device comprises:
    a control unit configured to control the display of the first image by the first projection device and the display of the second image by the second projection device based on the target image data, and
    the control unit includes:
    a first determination unit configured to determine light emission luminance based on the target image data; and
    a second determination unit configured to determine light emission luminance of the first light emission unit and light emission luminance of the second light emission unit such that a sum of the light emission luminance of the first light emission unit and the light emission luminance of the second light emission unit is equal to the light emission luminance determined by the first determination unit, and wherein when the light emission luminance determined by the first determination unit is equal to or less than an upper limit of the light emission luminance of the first light emission unit, the second determination unit determines light emission luminance of the first light emission unit equal to the light emission luminance determined by the first determination unit.

2. The control device according to claim 1, wherein
the first light emission unit has a plurality of first light source units that corresponds to a plurality of first areas constituting the projection area,
the second light emission unit has one or more second light source units that correspond to one or more second areas constituting the projection area,
the second area is formed from one or more first areas,
the first determination unit determines the light emission luminance for each of the first areas, and
the second determination unit determines the light emission luminances of the plurality of first light source units and the light emission luminances of the one or more second light source units based on the light emission luminance determined for each of the first areas by the first determination unit.

3. The control device according to claim 1, wherein
when the light emission luminance determined by the first determination unit is higher than the upper limit of the light emission luminance of the first light emission unit, the second determination unit determines light emission luminance equal to the upper limit of the light emission luminance of the first light emission unit as the light emission luminance of the first light emission unit, and determines light emission luminance corresponding to a difference between the light emission luminance of the first light emission unit and the light emission luminance determined by the first determination unit as the light emission luminance of the second light emission unit.

4. A control device connectable to a plurality of first projection devices and a second projection device, wherein
the plurality of first projection devices performs tile projection onto a projection area to display a first image onto a projection area to display a first image with a first resolution,
the second projection device performs projection onto the projection area to display a second image with a second resolution lower than the first resolution,
the plurality of first projection devices and the second projection device are arranged such that the plurality of first projection devices and the second projection devices perform stack projection, and
the first image and the second image are stacked to display an image based on target image data,
the control unit comprises:
a control unit configured to control the display of images of the first image by the first projection devices and the display of the second image by the second projection device based on the target image data.

5. The control device according to claim 4, wherein
the control unit has a generation unit configured to generate first image data and second image data based on the target image data,
the first projection device performs projection onto the projection area based on the first image data,
the second projection device performs projection onto the projection area based on the second image data, and
the generation unit generates image data with gradation equal to the gradation of the target image data as the first image data.

6. A method of a control device connectable to a first projection device and a second projection device, wherein
the first projection device performs projection onto a projection area in a projection surface to display a first image with a first resolution in the projection area,
the second projection device performs projection onto the projection area to display a second image with a second resolution lower than the first resolution in the projection area,
both the first image and the second image are displayed to display an image based on target image data in the projection area,
the first projection device includes a first light emission unit and a first projection unit configured to modulate light emitted from the first light emission unit and project the modulated light onto the projection area, and
the second projection device includes a second light emission unit and a second projection unit configured to modulate light emitted from the second light emission unit and project the modulated light onto the projection area,
the method comprises:
a control step of controlling display of the first image by the first projection device and display of the second image by the second projection device based on the target image data, and
the control step includes:
a first determination step of determining light emission luminance based on the target image data; and
a second determination step of determining light emission luminance of the first light emission unit and light emission luminance of the second light emission unit such that a sum of the light emission luminance of the first light emission unit and the light emission luminance of the second light emission unit is equal to the light emission luminance determined by the first determination step, and
wherein when the light emission luminance determined by the first determination step is equal to or less than an upper limit of the light emission luminance of the first light emission unit, the second determination step determines light emission luminance of the first light emission unit equal to the light emission luminance determined by the first determination unit.

7. A non-transitory medium storing a program for causing a computer to execute a method for a control device connectable to a first projection device and a second projection device, wherein
the first projection device performs projection onto a projection area in a projection surface to display a first image with a first resolution in the projection area,
the second projection device performs projection onto the projection area to display a second image with a second resolution lower than the first resolution in the projection area,
both the first image and the second image are displayed to display an image based on target image data in the projection area,
the first projection device includes a first light emission unit and a first projection unit configured to modulate light emitted from the first light emission unit and project the modulated light onto the projection area, and the second projection device includes a second light emission unit and a second projection unit configured to modulate light emitted from the second light emission unit and project the modulated light onto the projection area, the method comprises:

a control step of controlling display of the first image by the first projection device and display of the second image by the second projection device based on the target image data, and the control step includes:

a first determination step of determining light emission luminance based on the target image data; and a second determination step of determining light emission luminance of the first light emission unit and light emission luminance of the second light emission unit such that a sum of the light emission luminance of the first light emission unit and the light emission luminance of the second light emission unit is equal to the light emission luminance determined by the first determination step, and wherein when the light emission luminance determined by the first determination step is equal to or less than an upper limit of the light emission luminance of the first light emission unit, the second determination step determines light emission luminance of the first light emission unit.

* * * * *